(12) United States Patent
Iwasaki

(10) Patent No.: US 11,575,414 B2
(45) Date of Patent: *Feb. 7, 2023

(54) FIRST COMMUNICATION APPARATUS, SECOND COMMUNICATION APPARATUS, METHOD, PROGRAM, RECORDING MEDIUM, AND SYSTEM

(71) Applicant: NEC CORPORATION, Tokyo (JP)

(72) Inventor: Motoya Iwasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,380

(22) Filed: Sep. 27, 2021

(65) Prior Publication Data

US 2022/0014242 A1 Jan. 13, 2022

Related U.S. Application Data

(63) Continuation of application No. 16/494,618, filed as application No. PCT/JP2018/010027 on Mar. 14, 2018, now Pat. No. 1,116,574.

(30) Foreign Application Priority Data

Mar. 22, 2017 (JP) .............................. JP2017-055726

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0634* (2013.01); *H04B 7/08* (2013.01); *H04L 5/0048* (2013.01); *H04L 25/0224* (2013.01)

(58) Field of Classification Search
CPC .................................................... H04B 7/0456
(Continued)

(56) References Cited

U.S. PATENT DOCUMENTS 6,266,528 B1 7/2001 Farzaneh
11,165,474 B2 * 11/2021 Iwasaki .................. H04B 7/022
(Continued)

FOREIGN PATENT DOCUMENTS

CN 1339881 A 3/2002
CN 101416416 A 4/2009
(Continued)

OTHER PUBLICATIONS

Chinese Office Action for CN Application No. 201880019108.1 dated Mar. 31, 2022 with English Translation.
(Continued)

*Primary Examiner* — Lihong Yu
(74) *Attorney, Agent, or Firm* — Sughrue Mion, PLLC

(57) ABSTRACT

In order to enable both a circuit scale of an apparatus that receives signals via antennas and a band of an interface between apparatuses to be small, a first communication apparatus according to the present invention includes: a reception processing unit configured to receive, from a second communication apparatus which receives signals via a plurality of antennas, channel related information related to a channel of signals received via the plurality of antennas; and a transmission processing unit configured to transmit, to the second communication apparatus, weight information related to receiving antenna weights by which the second communication apparatus multiplies signals received via the plurality of antennas, the weight information being generated based on the channel related information.

20 Claims, 17 Drawing Sheets

(51) Int. Cl.
*H04B 7/08* (2006.01)
*H04L 5/00* (2006.01)
*H04L 25/02* (2006.01)

(58) Field of Classification Search
USPC ............................................. 375/267
See application file for complete search history.

(56) References Cited

U.S. PATENT DOCUMENTS

| | | |
|---|---|---|
| 2002/0151301 A1 | 10/2002 | Miyoshi |
| 2003/0218973 A1 | 11/2003 | Oprea et al. |
| 2004/0208258 A1 | 10/2004 | Lozano et al. |
| 2005/0249304 A1 | 11/2005 | Takano et al. |
| 2007/0072646 A1 | 3/2007 | Kuwahara et al. |
| 2007/0205943 A1 | 9/2007 | Nassiri-Toussi et al. |
| 2008/0153428 A1 | 6/2008 | Han et al. |
| 2012/0120997 A1 | 5/2012 | Park et al. |
| 2014/0192761 A1 | 7/2014 | Inoue et al. |
| 2014/0226736 A1 | 8/2014 | Niu et al. |
| 2016/0315674 A1 | 10/2016 | Li et al. |
| 2016/0338048 A1 | 11/2016 | Aiba et al. |
| 2017/0048826 A1 | 2/2017 | Kishiyama |
| 2018/0102824 A1 | 4/2018 | Jitsukawa et al. |
| 2018/0109305 A1 | 4/2018 | Obara et al. |

FOREIGN PATENT DOCUMENTS

| | | |
|---|---|---|
| JP | 2002-111565 A | 4/2002 |
| JP | 2010-130177 A | 6/2010 |
| JP | 2017-038193 A | 2/2017 |
| WO | 2015/107851 A1 | 7/2015 |
| WO | 2015/166840 A1 | 11/2015 |
| WO | 2016/152916 A1 | 9/2016 |
| WO | 2016/207929 A1 | 12/2016 |
| WO | 2017/041270 A1 | 3/2017 |

OTHER PUBLICATIONS

Communication dated Feb. 12, 2020 from European Patent Office in EP Application No. 18771589.1.
Written Opinion of the International Searching Authority for PCT/JP2018/010027 dated Jun. 5, 2018.
Mugen Peng, et al., "Fronthaul-Constrained Cloud Radio Access Networks: Insights and Challenges", IEEE Wireless Communications, Apr. 2015, pp. 152-160, vol. 22, Issue 2.
International Search Report for PCT/JP2018/010027 dated Jun. 5, 2018 [PCT/ISA/210].
JP Office Action for JP Application No. 2021-116418, dated May 24, 2022 with English Translation.

* cited by examiner

FIRST COMMUNICATION APPARATUS, SECOND COMMUNICATION APPARATUS, METHOD, PROGRAM, RECORDING MEDIUM, AND SYSTEM

CROSS REFERENCE TO RELATED APPLICATIONS

This application is a continuation of U.S. patent application Ser. No. 16/494,618, filed on Sep. 16, 2019, which is a National Stage of International Application No. PCT/JP2018/010027, filed on Mar. 14, 2018, which claims priority from Japanese Patent Application No. 2017-055726, filed on Mar. 22, 2017, the contents of all of which are incorporated herein by reference in their entirety.

BACKGROUND

Technical Field

The present invention relates to a first communication apparatus, a second communication apparatus, a method, a program, a recording medium, and a system.

Background Art

As mobile communication is further advanced, a data transmission rate is improved at a higher rate than available frequency bands are extended. Therefore, beamforming using a multi-element antenna, which allows improvement in a data transmission rate per frequency, has been considered as an effective technique. In the beamforming, beams for reception (and transmission) are formed, based on channel estimates that can be acquired from received signals of respective antenna elements included in a multi-element antenna.

For example, Patent Literature 1 discloses that a base station determines transmit beamforming weights and performs transmit beamforming, and a terminal apparatus determines receive beamforming weights and performs receive beamforming. For example, Patent Literature 2 discloses that a terminal apparatus determines transmitting antenna weights and receiving antenna weights, based on reference signals from a base station, and reports information related to these weights to the base station. Patent Literature 3 discloses an example of a structure of a base station that is separated into a remote radio unit (RRU) and a base band unit (BBU).

CITATION LIST

Patent Literature

[PTL 1] WO 2016/152916
[PTL 2] WO 2016/207929
[PTL 3] US 2014/0226736 A1

SUMMARY

Technical Problem

For example, as described in Patent Literature 3, a base station may be separated into an apparatus (e.g., an RRU) that receives signals via antennas and another apparatus (e.g., a BBU), or the like. In such a case, for example, which apparatus performs processing such as channel estimation, generation of antenna weights, and multiplication of antenna weights, may affect a circuit scale of the apparatus (e.g., an RRU) and a band of an interface between the apparatuses. However, in Patent Literature 3, which apparatus performs these processing is not discussed. Therefore, the technique described in Patent Literature 3 cannot enable both a circuit scale of the apparatus and a band of an interface between the apparatuses to be small.

An example object of the present invention is to provide a first communication apparatus and a second communication apparatus that enable both a circuit scale of an apparatus that receives signals via antennas and a band of an interface between apparatuses to be small.

Solution to Problem

A first communication apparatus according to an example aspect of the present invention includes a reception processing unit configured to receive, from a second communication apparatus which receives signals via a plurality of antennas, channel related information related to a channel of signals received via the plurality of antennas, and a transmission processing unit configured to transmit, to the second communication apparatus, weight information related to receiving antenna weights by which the second communication apparatus multiplies signals received via the plurality of antennas, the weight information being generated based on the channel related information.

A second communication apparatus according to an example aspect of the present invention includes a radio communication processing unit configured to receive signals via a plurality of antennas, a transmission processing unit configured to transmit, to a first communication apparatus, channel related information related to a channel of signals received via the plurality of antennas, and reception processing unit configured to receive, from the first communication apparatus, weight information related to reception antenna weights, the weight information being generated based on the channel related information, wherein the radio communication processing unit is configured to multiply signals received via the plurality of antennas by the receiving antenna weights.

A first method according to an example aspect of the present invention includes receiving, from a communication apparatus which receives signals via a plurality of antennas, channel related information related to a channel of signals received via the plurality of antennas, and transmitting, to the communication apparatus, weight information related to receiving antenna weights by which the communication apparatus multiplies signals received via the plurality of antennas, the weight information being generated based on the channel related information.

A second method according to an example aspect of the present invention includes receiving signals via a plurality of antennas, transmitting, to a communication apparatus, channel related information related to a channel of signals received via the plurality of antennas, receiving, from the communication apparatus, weight information related to reception antenna weights, the weight information being generated based on the channel related information, and multiplying signals received via the plurality of antennas by the receiving antenna weights.

A first program according to an example aspect of the present invention is a program that causes a processor to execute receiving, from a communication apparatus which receives signals via a plurality of antennas, channel related information related to a channel of signals received via the plurality of antennas, and transmitting, to the communication apparatus, weight information related to receiving antenna weights by which the communication apparatus multiplies signals received via the plurality of antennas, the weight information being generated based on the channel related information.

A second program according to an example aspect of the present invention is a program that causes a processor to execute receiving signals via a plurality of antennas, transmitting, to a communication apparatus, channel related information related to a channel of signals received via the plurality of antennas, receiving, from the communication apparatus, weight information related to reception antenna weights, the weight information being generated based on the channel related information, and multiplying signals received via the plurality of antennas by the receiving antenna weights.

A first recording medium according to an example aspect of the present invention is a non-transitory computer readable recording medium having recorded thereon a program that causes a processor to execute receiving, from a communication apparatus which receives signals via a plurality of antennas, channel related information related to a channel of signals received via the plurality of antennas, and transmitting, to the communication apparatus, weight information related to receiving antenna weights by which the communication apparatus multiplies signals received via the plurality of antennas, the weight information being generated based on the channel related information.

A second recording medium according to an example aspect of the present invention is a non-transitory computer readable recording medium having recorded thereon a program that causes a processor to execute receiving signals via a plurality of antennas, transmitting, to a communication apparatus, channel related information related to a channel of signals received via the plurality of antennas, receiving, from the communication apparatus, weight information related to reception antenna weights, the weight information being generated based on the channel related information, and multiplying signals received via the plurality of antennas by the receiving antenna weights.

A system according to an example aspect of the present invention includes a first communication apparatus and a second communication apparatus, wherein the second communication apparatus is configured to receive signals via a plurality of antennas, and transmit, to the first communication apparatus, channel related information related to a channel of signals received via the plurality of antennas, wherein the first communication apparatus is configured to receive the channel related information from the second communication apparatus, and transmit, to the second communication apparatus, weight information related to receiving antenna weights, the weight information being generated based on the channel related information, and wherein the second communication apparatus is configured to receive the weight information from the first communication apparatus, and multiply signals received via the plurality of antennas by the receiving antenna weights.

A third method includes, in a second communication apparatus, receiving signals via a plurality of antennas, and transmitting, to a first communication apparatus, channel related information related to a channel of signals received via the plurality of antennas, in the first communication apparatus, receiving the channel related information from the second communication apparatus, and transmitting, to the second communication apparatus, weight information related to receiving antenna weights, the weight information being generated based on the channel related information, and, in the second communication apparatus, receiving the weight information from the first communication apparatus, and multiplying signals received via the plurality of antennas by the receiving antenna weights.

Advantageous Effects of Invention

According to an example aspect of the present invention, both a circuit scale of an apparatus that receives signals via antennas and a band of an interface between apparatuses can be small. Note that, according to an example aspect of the present invention, instead of or together with the above effect, other effects may be exerted.

DESCRIPTION OF THE EXAMPLE EMBODIMENTS

Hereinafter, example embodiments of the present invention will be described in detail with reference to the accompanying drawings. Note that, in the Specification and drawings, elements to which the similar descriptions are applicable are denoted by the same reference signs, and overlapping descriptions may hence be omitted.

Descriptions will be given in the following order.
1. Related Art
2. Overview of Example Embodiments
3. First Example Embodiment
3.1. Configuration of System
3.2. Configuration of Digital Apparatus
3.3. Configuration of Radio Apparatus
3.4. Technical Features
3.5. Example Alteration
4. Second Example Embodiment
4.1. Configuration of System
4.2. Configuration of First Radio Apparatus
4.3. Configuration of Second Radio Apparatus
4.4. Technical Features

1. Related Art

First, with reference to FIG. 1 to FIG. 3, related art will be described. Note that, of course, the related art described herein may also be included in example embodiments of the present invention.

Example of Configuration of Base Station Using Multi-Element Antenna

Figure 1:
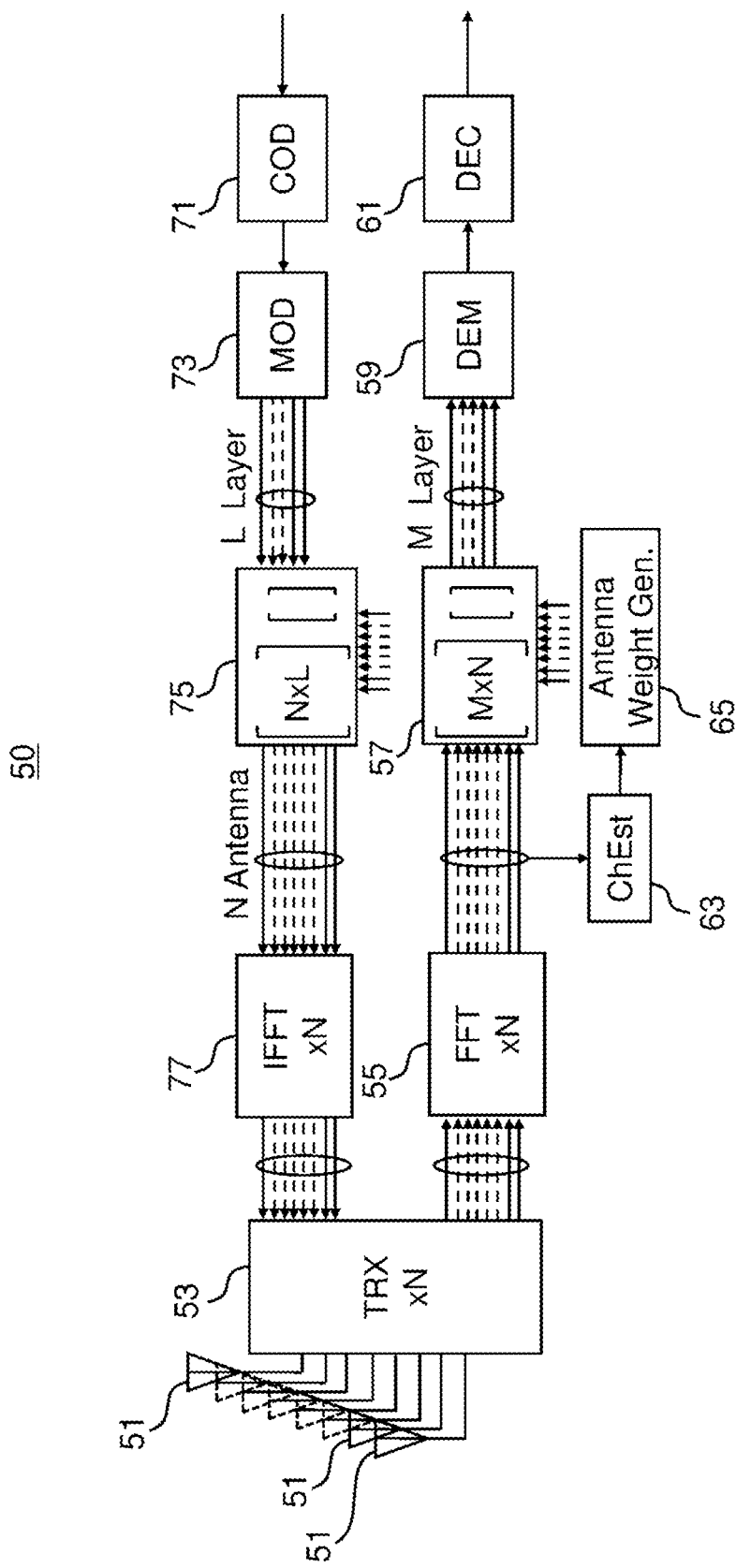
FIG. 1 is an explanatory diagram for describing an example of a configuration of a base station using a multi-element antenna.

FIG. 1 is an explanatory diagram for describing an example of a configuration of a base station 50 using a multi-element antenna.

Reception Processing

Radio received signals (N series of radio received signals) of N antenna elements 51 included in a multi-element antenna are converted into N series of reception baseband signals on a time axis by a transmission and/or reception unit 53, and are further converted into N series of received signals on a frequency axis by a fast Fourier transform (FFT) unit 55. Further, the N series of received signals are multiplied by a receiving antenna weight matrix having M rows and N columns by an antenna weight multiplication unit 57. As a result, M series of received signals (i.e., received signals of M layers) are output. The M series of received signals are demodulated by a demodulation unit 59, and are further decoded by a decoding unit 61.

A channel estimation unit 63 performs channel estimation, based on reference signals included in the N series of received signals, which are an output of the FFT unit 55. In this manner, N series of channel estimates are generated, and are then output. Further, the antenna weight generating unit 65 generates the receiving antenna weight matrix having M rows and N columns, based on the N series of channel estimates. Then, the receiving antenna weight matrix is used by the antenna weight multiplication unit 57 as described above. Note that the antenna weight generating unit 65 may also generate a transmitting antenna weight matrix having N rows and L columns, based on the N series of channel estimates.

Transmission Processing

Transmission signals are first coded by a coding unit 71, and are then modulated by a modulation unit 73. As a result, the transmission signals are turned into L series of transmission signals (transmission signals of L layers). The L series of transmission signals are multiplied by the transmitting antenna weight matrix having N rows and L columns by an antenna weight multiplication unit 75, so as to be turned into N series of transmission signals on a frequency axis. The N series of transmission signals on a frequency axis are converted into N series of baseband signals on a time axis by an inverse fast Fourier transform (IFFT) unit 77, and are further converted into N series of radio transmission signals by the transmission and/or reception unit 53. Then, the N series of radio transmission signals are transmitted from the N antenna elements included in the multi-element antenna.

Processing Arrangement in Base Station

In actual implementation, for example, the base station 50 in the example of FIG. 1 is divided into a radio apparatus including the transmission and/or reception unit 53, and a digital apparatus including the demodulation unit 59, the decoding unit 61, the coding unit 71, and the modulation unit 73. For example, the radio apparatus is arranged immediately close to the multi-element antenna, the digital apparatus is arranged indoors inside a station, and the radio apparatus and the digital apparatus are connected to each other with an optical fiber cable.

Here, a case (first processing arrangement case) where the antenna weight multiplication units 57 and 75 and the antenna weight generating unit 65 are arranged in a digital apparatus, and a case (second processing arrangement case) where the antenna weight multiplication units 57 and 75 and the antenna weight generating unit 65 are arranged in a radio apparatus are considered.

First Processing Arrangement Case

Figure 2:
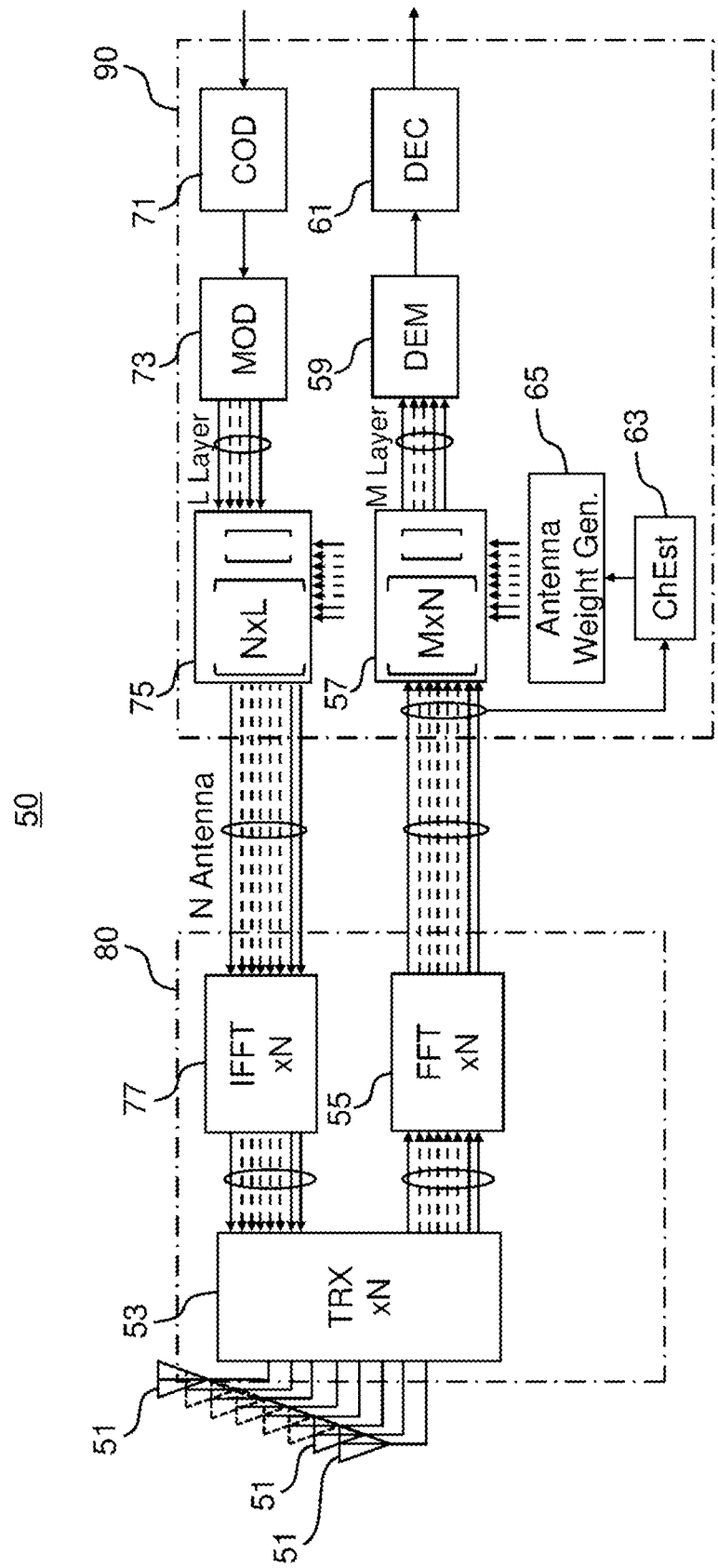
FIG. 2 is an explanatory diagram for describing a first processing arrangement case of the base station.

FIG. 2 is an explanatory diagram for describing the first processing arrangement case of the base station 50. In this example, the antenna weight multiplication units 57 and 75, the channel estimation unit 63, and the antenna weight generating unit 65 are arranged in a digital apparatus 90, not in a radio apparatus 80.

In the first processing arrangement case, a circuit scale of the radio apparatus 80 is small, and thus size and weight of the radio apparatus 80 are comparatively easily reduced. However, in this case, interfaces for N series of signals (i.e., N interfaces) for each of reception and transmission are required between the radio apparatus 80 and the digital apparatus 90. Therefore, when the number N of antenna elements is significantly large, a significantly large band is required between the radio apparatus 80 and the digital apparatus 90.

Second Processing Arrangement Case

Figure 3:
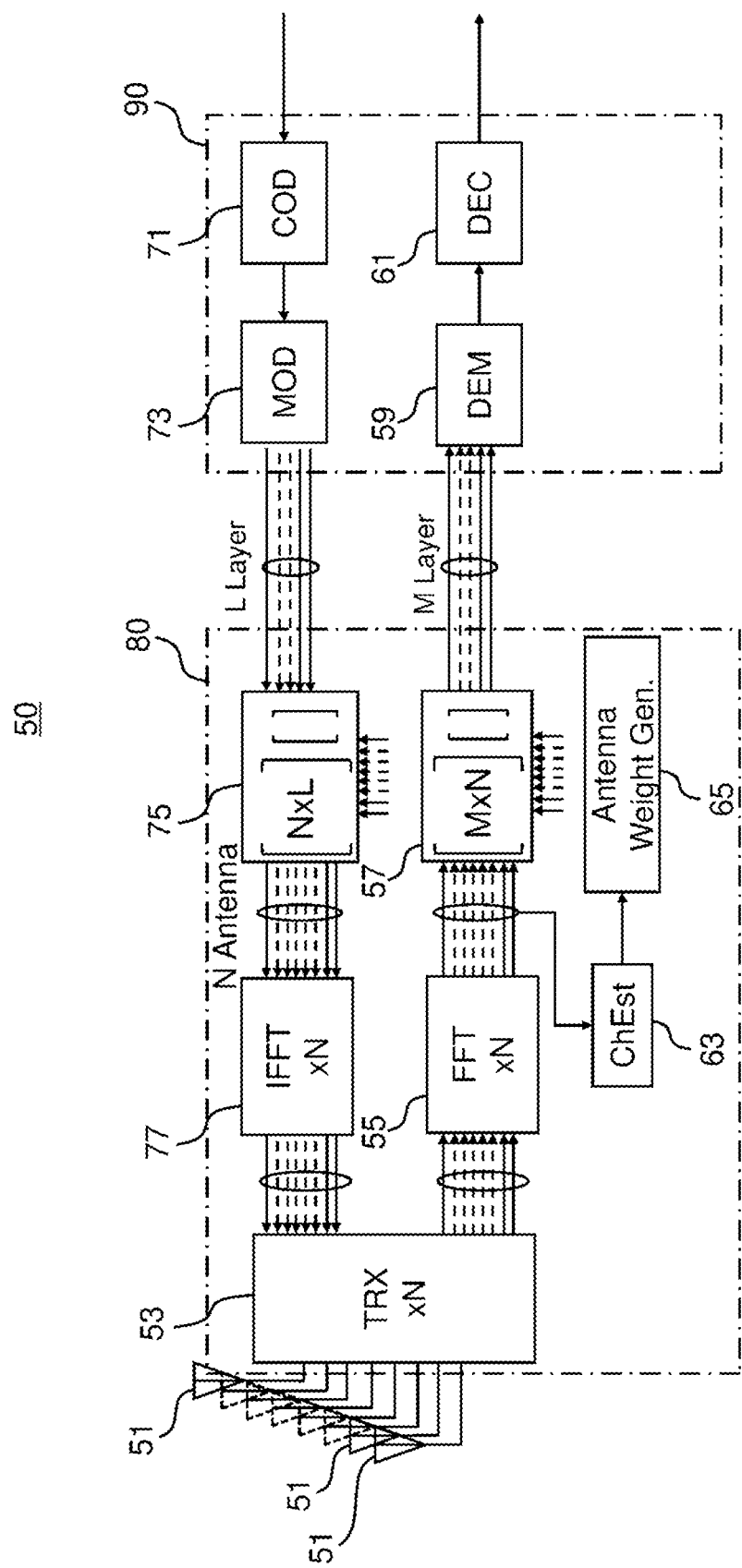
FIG. 3 is an explanatory diagram for describing a second processing arrangement case of the base station.

FIG. 3 is an explanatory diagram for describing the second processing arrangement case of the base station 50. In this example, the antenna weight multiplication units 57 and 75, the channel estimation unit 63, and the antenna weight generating unit 65 are arranged in a radio apparatus 80, not in a digital apparatus 90.

In the second processing arrangement case, interfaces for M series of signals (i.e., M interfaces) for reception and interfaces for L series of signals (i.e., L interfaces) for transmission are only required between the radio apparatus 80 and the digital apparatus 90. Therefore, even when the number N of antenna elements is significantly large, a not significantly large band is required between the radio apparatus 80 and the digital apparatus 90. However, channel estimation and generation of antenna weights (especially the latter) are complicated and special processing. Therefore, a circuit scale of the radio apparatus 80 is increased, which hinders reduction in size and weight of the radio apparatus 80. Further, channel estimation and generation of antenna weights are processing performed for each user (terminal apparatus), and therefore the radio apparatus 80 is required to perform processing in consideration of a user (terminal apparatus).

In the light of what has been described above, it is desirable to enable both a circuit scale of an apparatus (radio apparatus) that receives signals via antennas and a band of an interface between apparatuses (interface between a radio apparatus and a digital apparatus) to be small.

2. Overview of Example Embodiments

In example embodiments of the present invention (hereinafter referred to as the present example embodiments), a radio apparatus receives signals via a plurality of antennas (e.g., a plurality of antenna elements included in a multi-element antenna). Further, in the present example embodiments in particular, the radio apparatus multiplies the signals received via the plurality of antennas by receiving antenna weights.

Moreover, in the present example embodiments in particular, the radio apparatus transmits, to a digital apparatus, channel related information related to a channel of signals received via the plurality of antennas. The digital apparatus receives the channel related information. Then, based on the channel related information, weight information related to receiving antenna weights is generated. Further, the digital apparatus transmits the weight information to the radio apparatus. The radio apparatus receives the weight information. After that, the radio apparatus multiplies the signals received via the plurality of antennas by the receiving antenna weights.

In this manner, for example, both a circuit scale of the radio apparatus and a band of an interface between the radio apparatus and the digital apparatus can be small.

Note that the above-described technical features are concrete examples of the present example embodiments, and it is apparent that the present example embodiments are not limited to the above-described technical features.

3. First Example Embodiment

Next, with reference to FIG. 4 to FIG. 13, a first example embodiment of the present invention will be described.

<3.1. Configuration of System>

Figure 4:
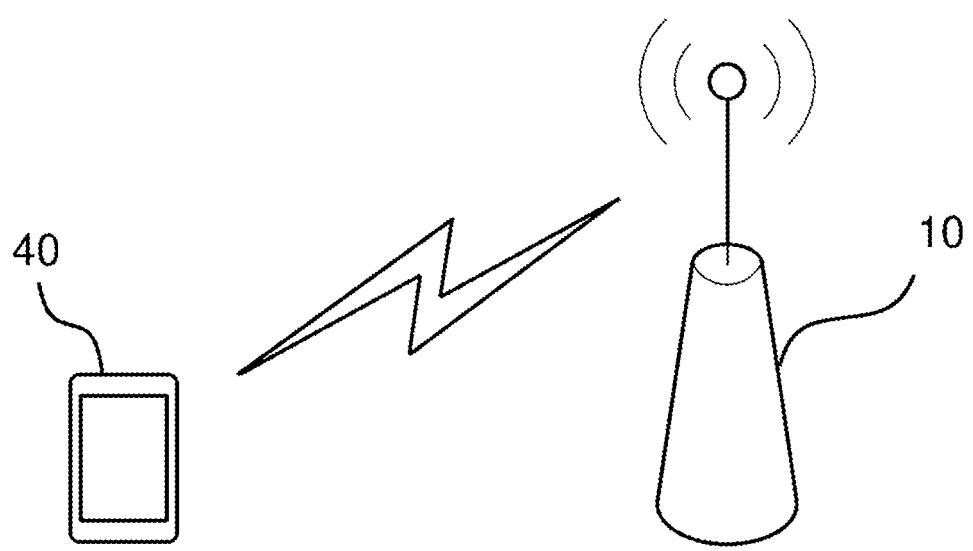
FIG. 4 is an explanatory diagram illustrating an example of a schematic configuration of a system according to a first example embodiment.

First, with reference to FIG. 4 and FIG. 5, an example of a configuration of a system 1 according to the first example embodiment will be described. FIG. 4 is an explanatory diagram illustrating an example of a schematic configuration of the system 1 according to the first example embodiment. With reference to FIG. 4, the system 1 includes a base station 10 and a terminal apparatus 40.

For example, the system 1 is a system conforming to Third Generation Partnership Project (3GPP) standards. More specifically, the system 1 may be a system conforming to LTE/LTE-Advanced and/or System Architecture Evolution (SAE). Alternatively, the system 1 may be a system conforming to fifth generation (5G) standards. Of course, the system 1 is not limited to these examples.

(1) Base Station 10

The base station 10 is a node of a radio access network (RAN), and performs radio communication with a terminal apparatus (e.g., the terminal apparatus 40) located in a coverage area.

Concrete Examples of Base Station 10

The base station 10 is a node that performs radio communication with a terminal apparatus, i.e., a node of a radio access network (RAN). For example, the base station 10 may be an evolved Node B (eNB), or may be a generation Node B (gNB) in 5G. The base station 10 may include a plurality of units (or a plurality of nodes). The plurality of units (or the plurality of nodes) may include a first unit (or a first node) that performs processing of a higher protocol layer, and a second unit (or a second node) that performs processing of a lower protocol layer. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 10 may be a single unit (or a single node). In this case, the base station 10 may be one unit (e.g., the second unit) of the plurality of units, and may be connected to another unit (e.g., the first unit) of the plurality of units.

Configuration of Base Station 10

Figure 5:
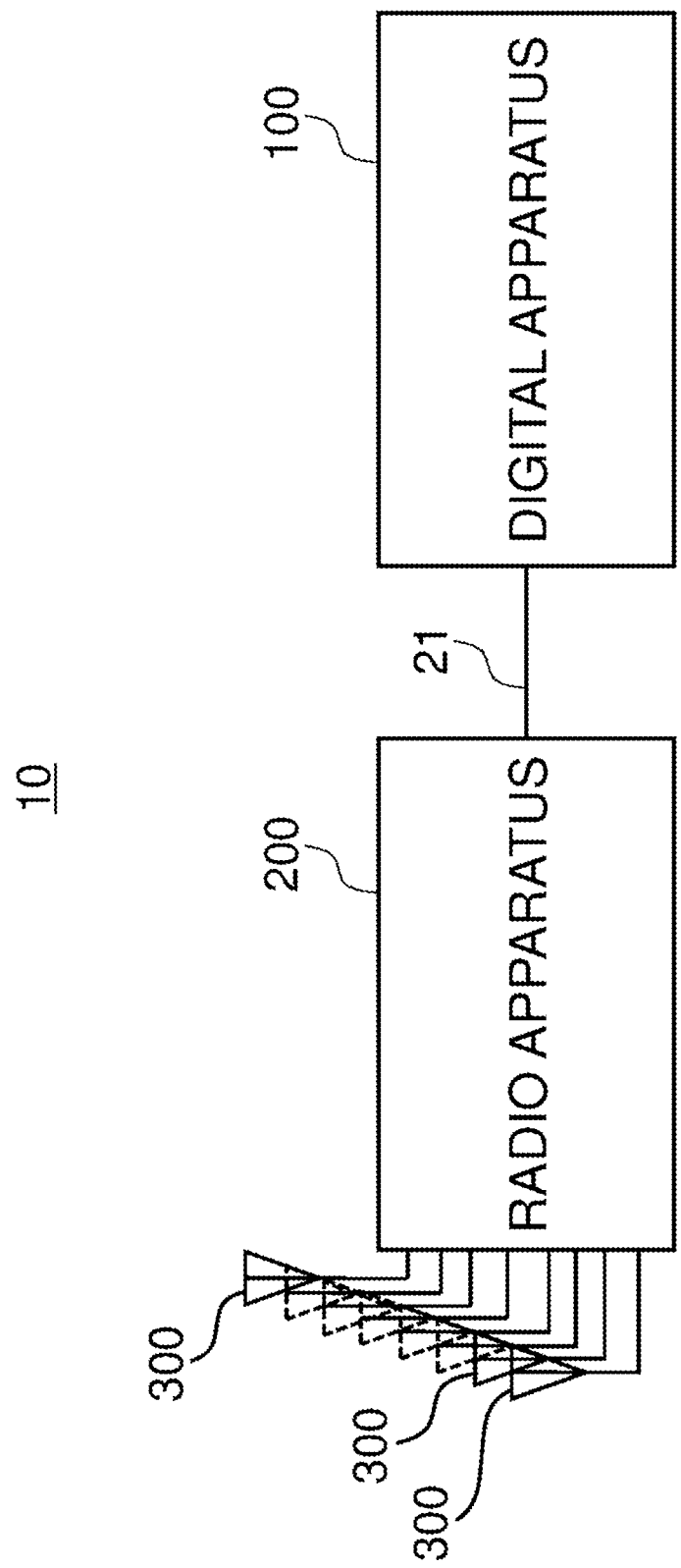
FIG. 5 is an explanatory diagram illustrating an example of a schematic configuration of the base station according to the first example embodiment.

FIG. 5 is an explanatory diagram illustrating an example of a schematic configuration of the base station 10 according to the first example embodiment. With reference to FIG. 5, the base station 10 includes a digital apparatus 100, a radio apparatus 200, and a plurality of antennas 300. For example, the base station 10 includes N antennas 300.

Digital Apparatus 100 and Radio Apparatus 200

Each of the digital apparatus 100 and the radio apparatus 200 is one of a plurality of apparatuses constituting the base station 10. The base station 10 may further include another apparatus (not illustrated) other than the digital apparatus 100 and the radio apparatus 200 (and the plurality of antennas 300).

The radio apparatus 200 is an apparatus physically separated from the digital apparatus 100. The radio apparatus 200 is connected to the plurality of antennas 300. The digital apparatus 100 is connected to the radio apparatus 200. The digital apparatus 100 and the radio apparatus 200 are connected to each other with a communication line 21. The digital apparatus 100 receives information from the radio apparatus 200 via the communication line 21, and transmits information to the radio apparatus 200 via the communication line 21. For example, the communication line 21 is an optical fiber line. For example, the digital apparatus 100 is located indoors, and the radio apparatus 200 is located outdoors.

When the base station 10 includes the first unit and the second unit as described above, the digital apparatus 100 may be the first unit (e.g., a digital unit (DU) or a BBU), and the radio apparatus 200 may be the second unit (e.g., a remote/radio unit (RU), an RRH, or an RRU). Alternatively, the digital apparatus 100 and the radio apparatus 200 may be an apparatus included in the second unit (e.g., a distributed unit (DU)).

Note that the digital apparatus 100 is referred to as a digital apparatus since the digital apparatus 100 performs processing of digital signals. More generally, however, the digital apparatus 100 may be referred to as a communication apparatus. The radio apparatus 200 is referred to as a radio apparatus since the radio apparatus 200 performs processing of radio signals as in the later description. More generally, however, the radio apparatus 200 may be referred to as a communication apparatus. Of course, the radio apparatus 200 may perform processing of digital signals, as well as processing of radio signals. Here, for the sake of better understanding of the first example embodiment, the terms "digital apparatus" and "radio apparatus" are used, instead of the term "communication apparatus."

Plurality of Antennas 300

For example, each of the plurality of antennas 300 is an antenna element included in a multi-element antenna. For example, the multi-element antenna is an antenna for massive multiple-input and multiple-output (massive MIMO).

(2) Terminal Apparatus 40

The terminal apparatus 40 performs radio communication with a base station. For example, when the terminal apparatus 40 is located in a coverage area of the base station 10, the terminal apparatus 40 performs radio communication with the base station 10. For example, the terminal apparatus 40 may be referred to as a user equipment (UE), a user terminal, or a mobile station.

FIG. 4 illustrates only one terminal apparatus 40. However, of course, a plurality of terminal apparatus 40 may be present.

<3.2. Configuration of Digital Apparatus>

Figure 6:
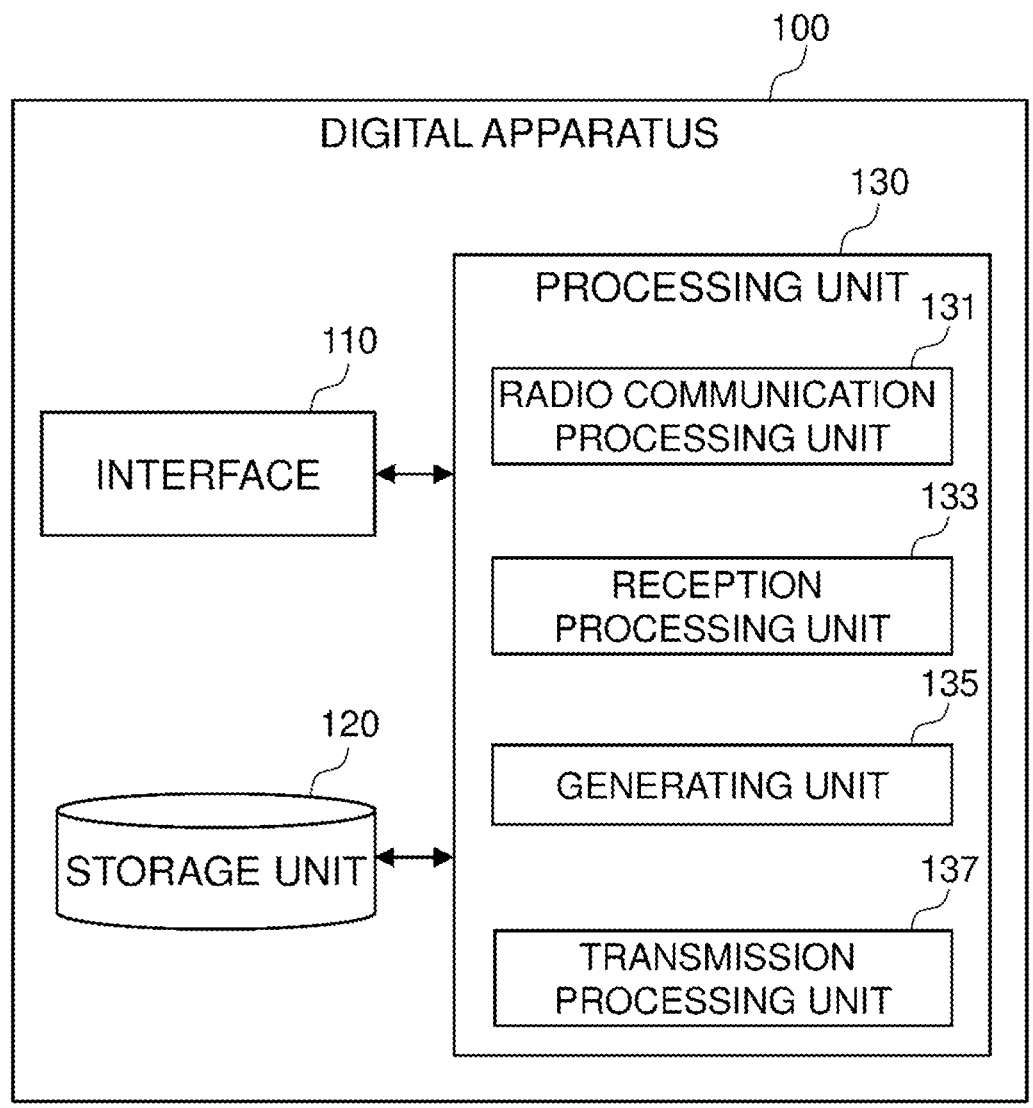
FIG. 6 is a block diagram illustrating an example of a schematic configuration of a digital apparatus according to the first example embodiment.

Next, with reference to FIG. 6, an example of a configuration of the digital apparatus 100 according to the first example embodiment will be described. FIG. 6 is a block diagram illustrating an example of a schematic configuration of the digital apparatus 100 according to the first example embodiment. With reference to FIG. 6, the digital apparatus 100 includes an interface 110, a storage unit 120, and a processing unit 130.

(1) Interface 110

The interface 110 is an interface for communication with the radio apparatus 200. In other words, the interface 110 is an interface for the communication line 21 (e.g., an optical fiber line) that connects the digital apparatus 100 and the radio apparatus 200. Through the interface 110, signals from the radio apparatus 200 are received, and signals to the radio apparatus 200 are transmitted.

(2) Storage Unit 120

The storage unit 120 temporarily or permanently stores programs (instructions) and parameters for operation of the digital apparatus 100, and various pieces of data. The program includes one or more instructions for operations of the digital apparatus 100.

(3) Processing Unit 130

The processing unit 130 provides various functions of the digital apparatus 100. The processing unit 130 includes a radio communication processing unit 131, a reception processing unit 133, a generating unit 135, and a transmission processing unit 137. Note that the processing unit 130 may further include another constituent element other than these constituent elements. Specifically, the processing unit 130 may also perform operation other than operation of these constituent elements. Concrete operations of the radio communication processing unit 131, the reception processing unit 133, the generating unit 135, and the transmission processing unit 137 will be described later in detail.

For example, the processing unit 130 communicates with the radio apparatus 200 via the interface 110.

(4) Implementation Example

The interface 110 may be implemented with a converter (e.g., an optical/electrical (O/E) converter and/or an electrical/optical (E/O) converter), or the like. The storage unit 120 may be implemented with a memory (e.g., a non-volatile memory and/or a volatile memory) and/or a hard disk, or the like. The processing unit 130 may be implemented with one or more processors, such as a baseband (BB) processor and/or another type of processor. The radio communication processing unit 131, the reception processing unit 133, the generating unit 135, and the transmission processing unit 137 may be implemented with the same processor, or may be implemented with separate processors. The memory (storage unit 120) may be included in the one or more processors, or may be located outside the one or more processors.

The digital apparatus 100 may include a memory that stores a program (instructions), and one or more processors that can execute the program (instructions). The one or more processors may execute the program to perform operations of the processing unit 130 (operations of the radio communication processing unit 131, the reception processing unit 133, the generating unit 135, and/or the transmission processing unit 137). The program may be a program for causing the processor(s) to execute operations of the processing unit 130 (operations of the radio communication processing unit 131, the reception processing unit 133, the generating unit 135, and/or the transmission processing unit 137).

<3.3. Configuration of Radio Apparatus>

Figure 7:
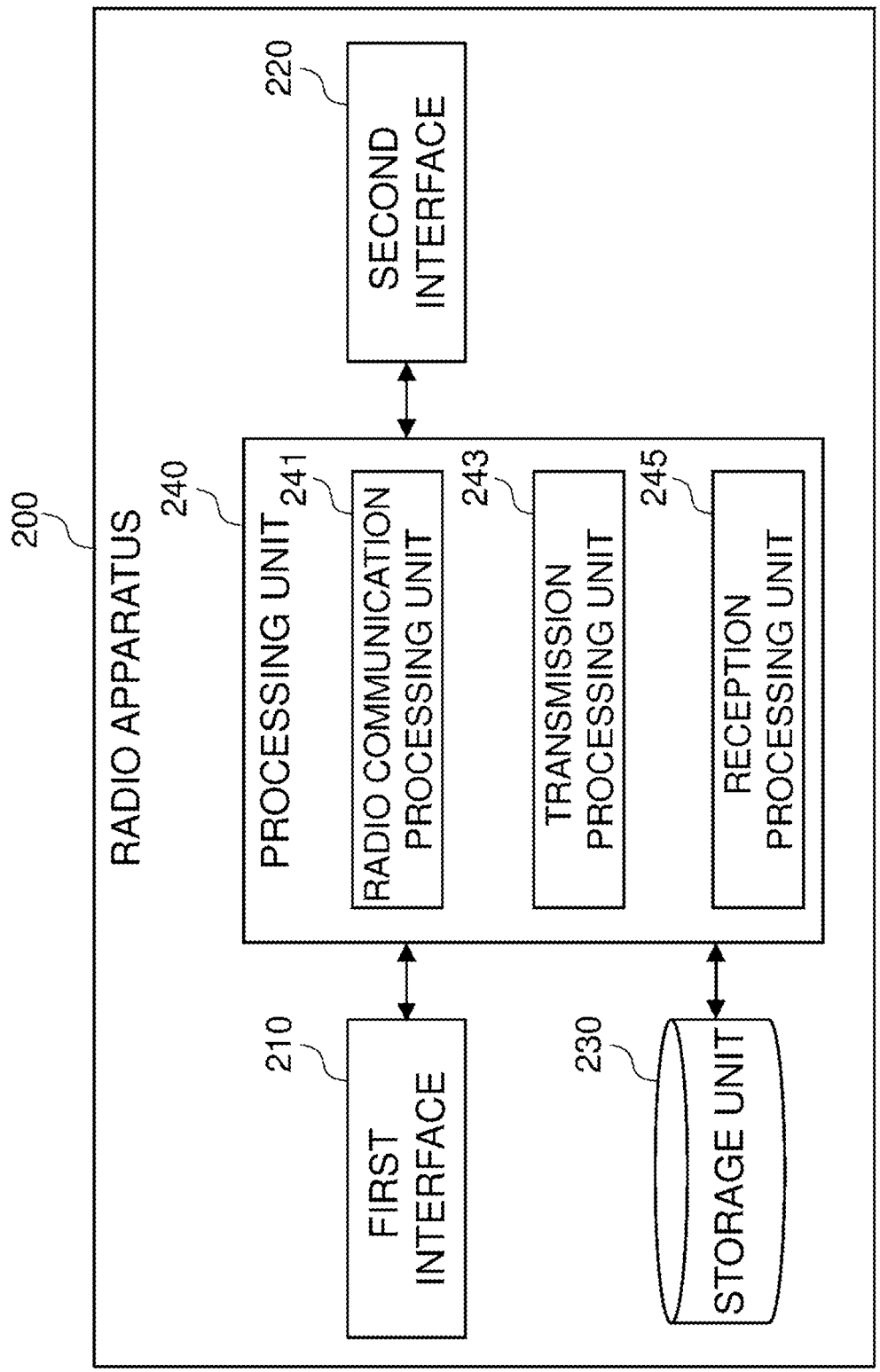
FIG. 7 is a block diagram illustrating an example of a schematic configuration of a radio apparatus according to the first example embodiment.

Next, with reference to FIG. 7, an example of a configuration of the radio apparatus 200 according to the first example embodiment will be described. FIG. 7 is a block diagram illustrating an example of a schematic configuration of the radio apparatus 200 according to the first example embodiment. With reference to FIG. 7, the radio apparatus 200 includes a first interface 210, a second interface 220, a storage unit 230, and a processing unit 240.

(1) First Interface 210

The first interface 210 is an interface for radio communication via the plurality of antennas 300. The first interface 210 receives radio signals from the plurality of antennas 300, and transmits radio signals to the plurality of antennas 300.

(2) Second Interface 220

The second interface 220 is an interface for communication with the digital apparatus 100. In other words, the second interface 220 is an interface for the communication line 21 (e.g., an optical fiber line) that connects the digital apparatus 100 and the radio apparatus 200. The second interface 220 receives signals from the digital apparatus 100, and transmits signals to the digital apparatus 100.

(3) Storage Unit 230

The storage unit 230 temporarily or permanently stores programs (instructions) and parameters for operation of the radio apparatus 200, and various pieces of data. The program includes one or more instructions for operations of the radio apparatus 200.

(4) Processing Unit 240

The processing unit 240 provides various functions of the radio apparatus 200. The processing unit 240 includes a radio communication processing unit 241, a transmission processing unit 243, and a reception processing unit 245. Note that the processing unit 240 may further include another constituent element other than these constituent elements. In other words, the processing unit 240 may also perform operations other than the operations of these constituent elements. Concrete operations of the radio communication processing unit 241, the transmission processing unit 243, and the reception processing unit 245 will be described later in detail.

For example, the processing unit 240 communicates with the digital apparatus 100 via the second interface 220. The processing unit 240 (radio communication processing unit 241) transmits and/or receives radio signals via the first interface 210 (hence, via the plurality of antennas 300).

(5) Implementation Example

The first interface 210 may be implemented with a radio frequency (RF) circuit and an A/D converter, or the like. The second interface 220 may be implemented with a converter (e.g., an O/E converter and/or an E/O converter), or the like. The storage unit 230 may be implemented with a memory (e.g., a non-volatile memory and/or a volatile memory) and/or a hard disk, and the like. The processing unit 240 may be implemented with one or more processors, such as a BB processor and/or another type of processor. The radio communication processing unit 241, the transmission processing unit 243, and the reception processing unit 245 may be implemented with the same processor, or may be implemented with separate processors. The memory (storage unit 230) may be included in the one or more processors, or may be located outside the one or more processors.

The radio apparatus 200 may include a memory that stores a program (instructions), and one or more processors that can execute the program (instructions). The one or more processors may execute the program to perform operations of the processing unit 240 (operations of the radio communication processing unit 241, the transmission processing unit 243, and/or the reception processing unit 245). The program may be a program for causing the processor(s) to execute operations of the processing unit 240 (operations of the radio communication processing unit 241, the transmission processing unit 243, and/or the reception processing unit 245).

<3.4. Technical Features>

Next, with reference to FIG. 8 to FIG. 14, technical features of the first example embodiment will be described.

(1) Radio Communication Processing

Reception Processing

The radio apparatus 200 (first interface 210 and radio communication processing unit 241) receives signals via the plurality of antennas 300. Further, in the first example embodiment in particular, the radio apparatus 200 (radio communication processing unit 241) multiplies the signals received via the plurality of antennas 300 by receiving antenna weights. For example, the receiving antenna weights may also be referred to as (receive) beamforming weights (i.e., weights used on a reception side to perform beamforming).

For example, the digital apparatus 100 (radio communication processing unit 131) performs demodulation and decoding for signals of one or more layers generated by the radio apparatus 200 multiplying the signals received via the plurality of antennas 300 by the receiving antenna weights.

Figure 8:
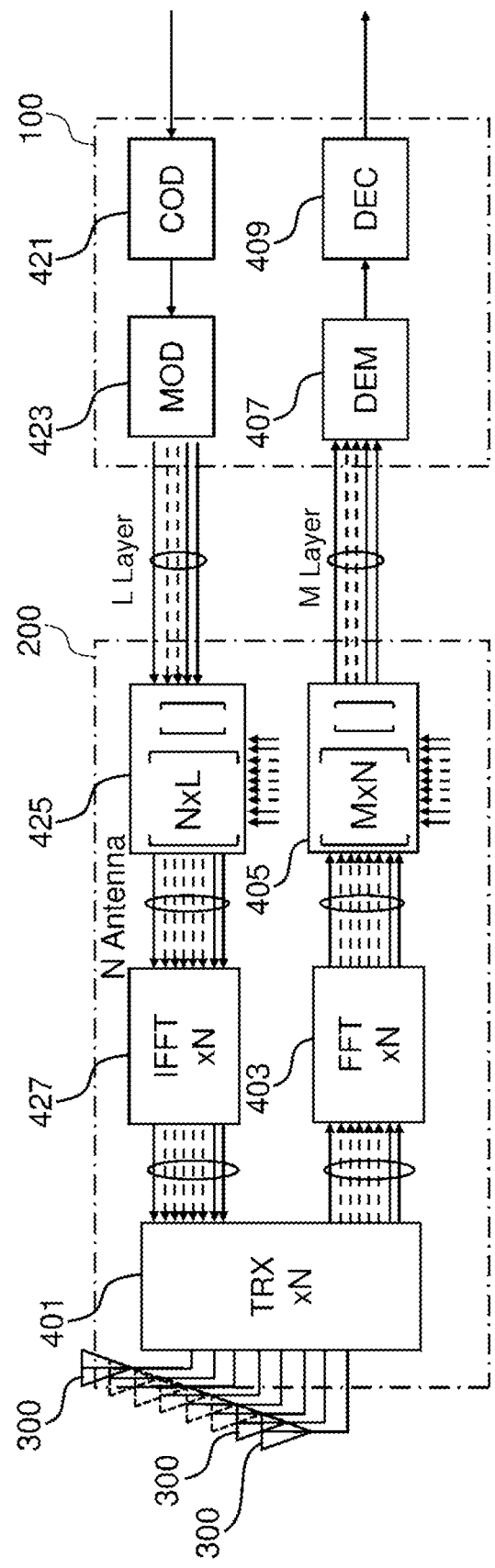
FIG. 8 is an explanatory diagram for describing a schematic example of radio communication processing of the first example embodiment.

With reference to FIG. 8, an example of reception processing of the digital apparatus 100 and the radio apparatus 200 will be described. FIG. 8 is an explanatory diagram for describing a schematic example of radio communication processing of the first example embodiment.

The radio apparatus 200 (transmission and/or reception unit 401) converts radio received signals (N series of radio received signals) of the plurality of antennas 300 (N antennas 300) into N series of reception baseband signals on a time axis. Then, the radio apparatus 200 (FFT unit 403) converts the N series of reception baseband signals on a time axis into N series of received signals on a frequency axis, by means of FFT. Further, the radio apparatus 200 (antenna weight multiplication unit 405) multiplies the N series of received signals on a frequency axis by a receiving antenna weight matrix having M rows and N columns (a vector if M is 1). As a result, M series of received signals (i.e., received signals of M layers) are output, to be transmitted to the digital apparatus 100.

For example, as described above, signals to be transmitted from the radio apparatus 200 to the digital apparatus 100 are not N series of received signals, but are M series of received signals (received signals of M layers). Therefore, even when the number N of antennas is increased, a band of an interface between the digital apparatus 100 and the radio apparatus 200 can be small.

The digital apparatus 100 (demodulation unit 407 and decoding unit 409) demodulates the M series of received signals (i.e., received signals of M layers), and decodes the demodulated received signals. For example, decoded information is transmitted from the digital apparatus 100 to another apparatus, and is to be processed by such another apparatus. Alternatively, decoded information may be further processed by the digital apparatus 100.

Note that, for example, the transmission and/or reception unit 401 of FIG. 8 is included in the first interface 210 of FIG. 7, and the FFT unit 403 and the antenna weight multiplication unit 405 of FIG. 8 are included in the radio communication processing unit 241 of FIG. 7. For example, the demodulation unit 407 and the decoding unit 409 of FIG. 8 are included in the radio communication processing unit 131 of FIG. 6.

For example, as described above, the digital apparatus 100 and the radio apparatus 200 perform reception processing of a physical layer (also referred to as layer 1). Specifically, the radio apparatus 200 performs a part of reception processing of the physical layer, and the digital apparatus 100 performs the rest of reception processing of the physical layer.

Transmission Processing

For example, the digital apparatus 100 (radio communication processing unit 131) performs coding and modulation to generate signals of one or more layers.

For example, in the first example embodiment in particular, the radio apparatus 200 (radio communication processing unit 241) multiplies the signals of one or more layers by the transmitting antenna weights. Further, the radio apparatus 200 (first interface 210 and radio communication processing unit 241) transmits the signals generated by being multiplied by the transmitting antenna weights, via the plurality of antennas 300. For example, the transmitting antenna weights may also be referred to as (transmit) beamforming weights (i.e., weights used on a transmission side to perform beamforming).

With reference to FIG. 8 again, the digital apparatus 100 (coding unit 421 and modulation unit 423) codes transmission signals, and modulates the coded transmission signals. As a result, L series of transmission signals (transmission signals of L layers) are output, to be transmitted to the radio apparatus 200.

The radio apparatus 200 (antenna weight multiplication unit 425) multiplies the L series of transmission signals by a transmitting antenna weight matrix having N rows and L columns, to thereby generate N series of transmission signals on a frequency axis. Then, the radio apparatus 200 (IFFT unit 427) converts the N series of transmission signals on a frequency axis into N series of baseband signals on a time axis, by means of IFFT. Further, the radio apparatus 200 (transmission and/or reception unit 401) converts the N series of baseband signals on a time axis into N series of radio transmission signals. Then, the N series of radio transmission signals are transmitted from the plurality of antennas 300 (N antennas 300).

For example, as described above, signals to be transmitted from the digital apparatus 100 to the radio apparatus 200 are not N series of received signals, but are L series of received signals (received signals of L layers). Therefore, even when the number N of antennas is increased, a band of an interface between the digital apparatus 100 and the radio apparatus 200 can be small.

Note that, for example, the coding unit 421 and the modulation unit 423 of FIG. 8 are included in the radio communication processing unit 131 of FIG. 6. For example, the antenna weight multiplication unit 425 and the IFFT unit 427 of FIG. 8 are included in the radio communication processing unit 241 of FIG. 7, and the transmission and/or reception unit 401 of FIG. 8 is included in the first interface 210 of FIG. 7.

For example, as described above, the digital apparatus 100 and the radio apparatus 200 perform transmission processing of a physical layer (also referred to as layer 1). Specifically, the radio apparatus 200 performs a part of transmission processing of the physical layer, and the digital apparatus 100 performs the rest of transmission processing of the physical layer.

(2) Receiving Antenna Weights

In the first example embodiment in particular, the radio apparatus 200 (transmission processing unit 243) transmits, to the digital apparatus 100, channel related information related to a channel of signals received via the plurality of antennas 300. The digital apparatus 100 (reception processing unit 133) receives the channel related information from the radio apparatus 200.

For example, the digital apparatus 100 (generating unit 135) generates weight information related to receiving antenna weights, based on the channel related information.

Further, the digital apparatus 100 (transmission processing unit 137) transmits the weight information to the radio apparatus 200. The radio apparatus 200 (reception processing unit 245) receives the weight information from the digital apparatus 100.

After that, the radio apparatus 200 (radio communication processing unit 241) multiplies the signals received via the plurality of antennas 300 by the receiving antenna weights.

(2-1) Signal

The signals received via the plurality of antennas 300 are uplink signals (i.e., signals transmitted from the terminal apparatus 40 to the base station 10).

(2-2) Channel Related Information

Channel

For example, the channel is a channel between the terminal apparatus 40 and the plurality of antennas 300.

First Example: Reference Signal

For example, the channel related information is reference signals received via the plurality of antennas 300. Specifically, the radio apparatus 200 (transmission processing unit 243) transmits the reference signals to the digital apparatus 100. The reference signals are information to be used for channel estimation of the channel.

In this case, the digital apparatus 100 (generating unit 135) performs channel estimation, based on the reference signals to calculate channel estimates. Then, the digital apparatus 100 (generating unit 135) generates the weight information, based on the channel estimates.

Figure 9:
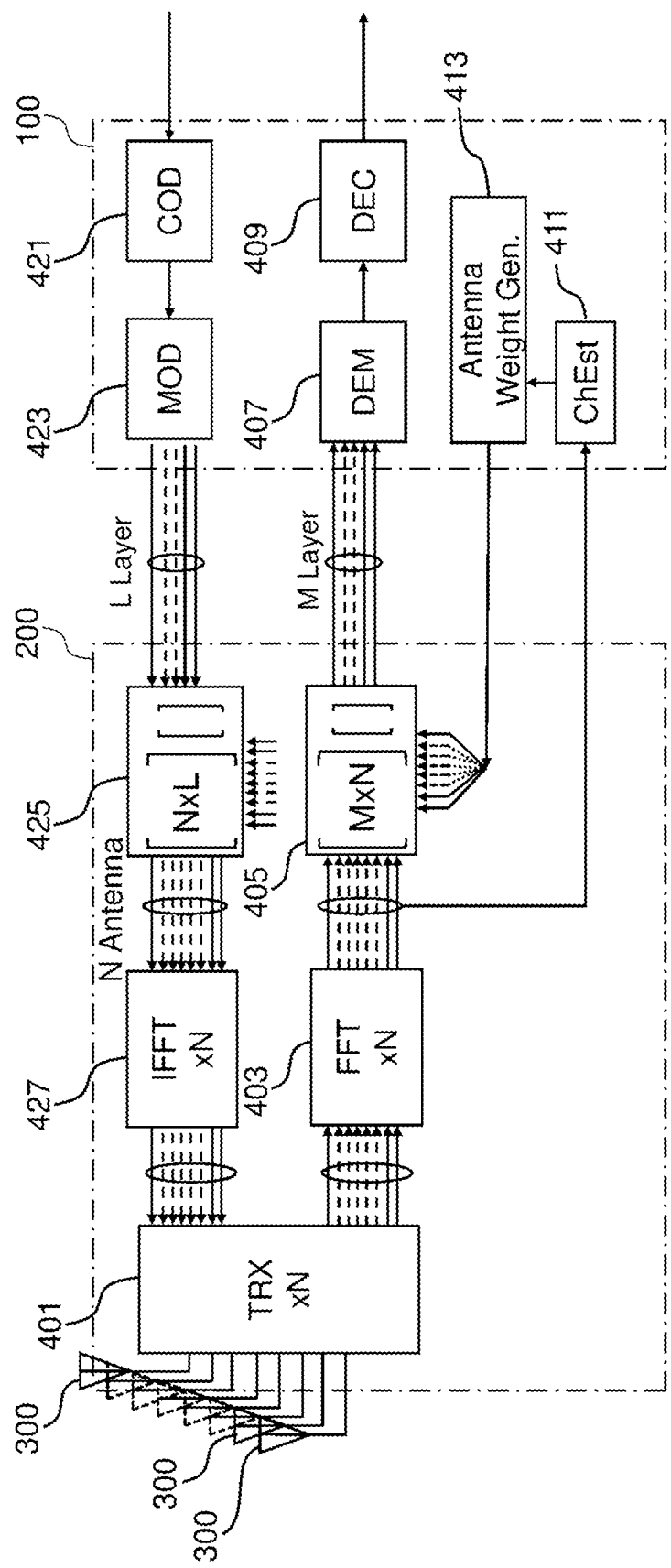
FIG. 9 is an explanatory diagram for describing a first example of channel estimation and weight information generation of the first example embodiment.

With reference to FIG. 9, a first example of channel estimation and weight information generation will be described. FIG. 9 is an explanatory diagram for describing a first example of channel estimation and weight information generation of the first example embodiment. With reference to FIG. 9, the radio apparatus 200 (transmission processing unit 243) transmits reference signals (N series of reference signals) of an output (N series of received signals on a frequency axis) of the FFT unit 403 to the digital apparatus 100. The digital apparatus 100 (reception processing unit 133) receives the reference signals. Then, the digital apparatus 100 (channel estimation unit 411: generating unit 135) performs channel estimation, based on the reference signals to calculate channel estimates (N series of channel estimates). Further, the digital apparatus 100 (antenna weight generating unit 413: generating unit 135) calculates receiving antenna weights (receiving antenna weight matrix having M rows and N columns), based on the channel estimates to generate weight information related to the receiving antenna weights. The digital apparatus 100 (transmission processing unit 137) transmits the weight information to the radio apparatus 200. The radio apparatus 200 (reception processing unit 245) receives the weight information. After that, the radio apparatus 200 (radio communication processing unit 241) sets the receiving antenna weights as weights to be used to multiply the signals received via the plurality of antennas 300. This configuration allows the radio apparatus 200 (radio communication processing unit 241) to multiply the signals received via the plurality of antennas 300 by the receiving antenna weights.

According to this example, neither the channel estimation unit 411 nor the antenna weight generating unit 413 is included in the radio apparatus 200, but both the channel estimation unit 411 and the antenna weight generating unit 413 are included in the digital apparatus 100. Therefore, a circuit scale of the radio apparatus 200 can be further reduced.

Figure 10:
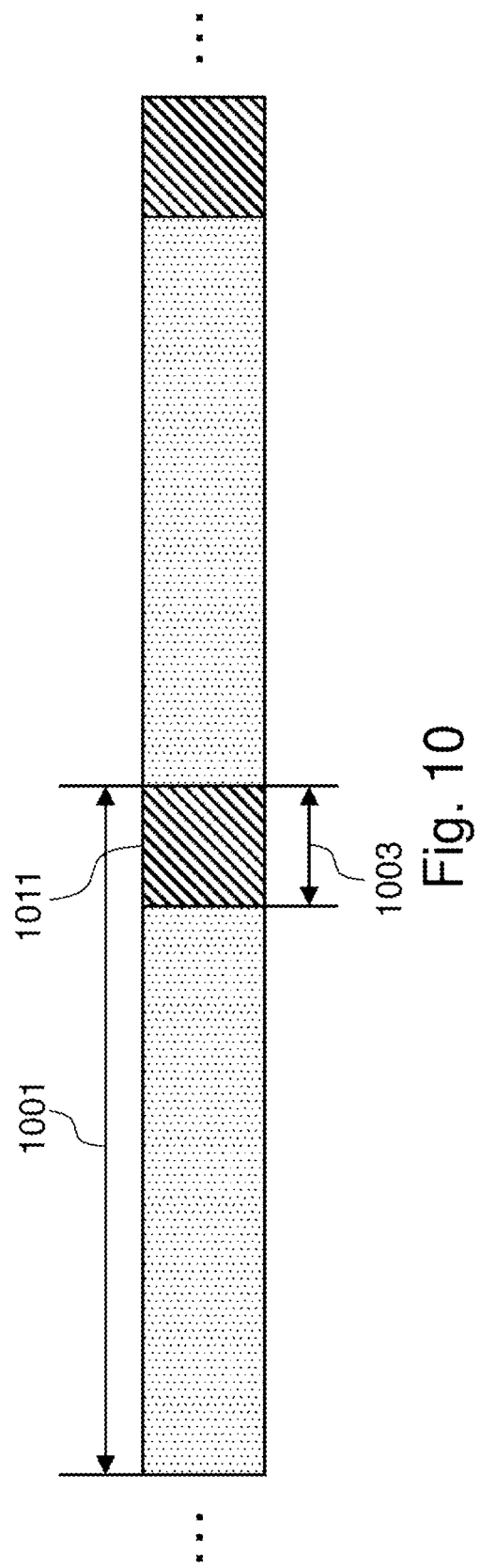
FIG. 10 is an explanatory diagram for describing an example of reference signals of the first example embodiment.

For example, the reference signals are reference signals transmitted during a specific period in a time frame. FIG. 10 is an explanatory diagram for describing an example of the reference signals of the first example embodiment. With reference to FIG. 10, one of repeated time frames 1001, and a specific period 1003 in one time frame 1001 are illustrated. For example, reference signals 1011 are transmitted in the specific period 1003. For example, a signal pattern of the reference signals 1011 is constant in the entire band, and thus each user (each terminal apparatus) transmits reference signals in an allocated band of the entire band. For example, this configuration facilitates transmission of reference signals from the radio apparatus 200 to the digital apparatus 100. More specifically, for example, even if the radio apparatus 200 does not hold information for each user (terminal apparatus), the radio apparatus 200 can extract only reference signals out of received signals, and can transmit the reference signals to the digital apparatus 100. Note that the specific period 1003 is located at the end of the time frame 1001 as illustrated in FIG. 10, for example. However, location of the specific period 1003 is not limited to this example. For example, the specific period 1003 may be located at the beginning of the time frame 1001, or may be located at a position other than the beginning and the end of the time frame 1001. The specific period 1003 may be one continuous period as illustrated in FIG. 10, or may be two or more distributed periods.

As an example, the time frame is a radio frame, and the specific period is a specific symbol. Specifically, the reference signals are transmitted in a specific symbol in a radio frame. Note that, for example, one radio frame includes a predetermined number of subframes, and one subframe includes a predetermined number of symbols. Note that the time frame and the specific period are not limited to this example.

For example, the reference signals are sounding reference signals (SRS). Alternatively, the reference signals may be demodulation reference signals (DMRS).

Figure 11:
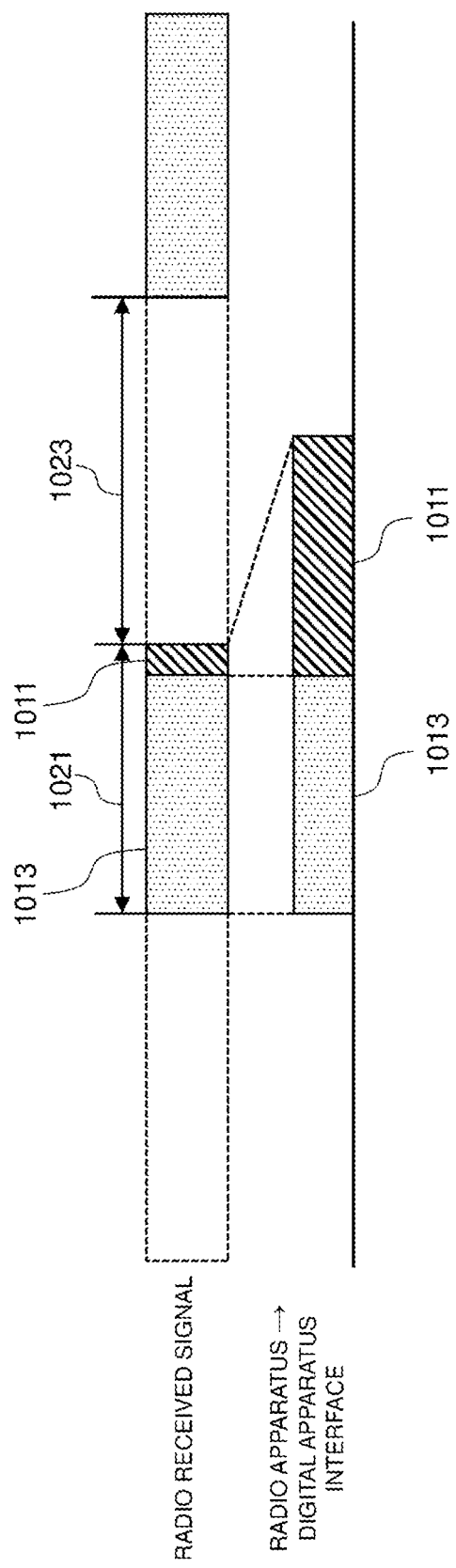
FIG. 11 is an explanatory diagram for describing an example of transmission of reference signals of the first example embodiment.

Note that the base station 10 (digital apparatus 100 and radio apparatus 200) may perform communication in time division duplex (TDD). In this case, for example, as illustrated in FIG. 11, the reference signals 1011 may be transmitted from the radio apparatus 200 to the digital apparatus 100. Specifically, the radio apparatus 200 receives reference signals 1011 and other signals 1013 (such as data signals and control signals) as radio received signals in a reception period 1021 (i.e., an uplink period), whereas the radio apparatus 200 does not receive signals in a transmission period 1023 (i.e., a downlink period). Therefore, as illustrated in FIG. 11, for example, the radio apparatus 200 may transmit such other signals (M series of signals) to the digital apparatus 100 in the reception period 1021, and may transmit the reference signals (N series of signals) to the digital apparatus 100 in the subsequent transmission period 1023 (and a part of the reception period 1021).

Second Example: Channel Estimates

The channel related information may be channel estimates which the radio apparatus 200 calculates by channel estimation based on reference signals received via the plurality of antennas 300. Specifically, the radio apparatus 200 may perform channel estimation, based on the reference signals to calculate channel estimates, and transmit the channel estimates to the digital apparatus 100.

Figure 12:
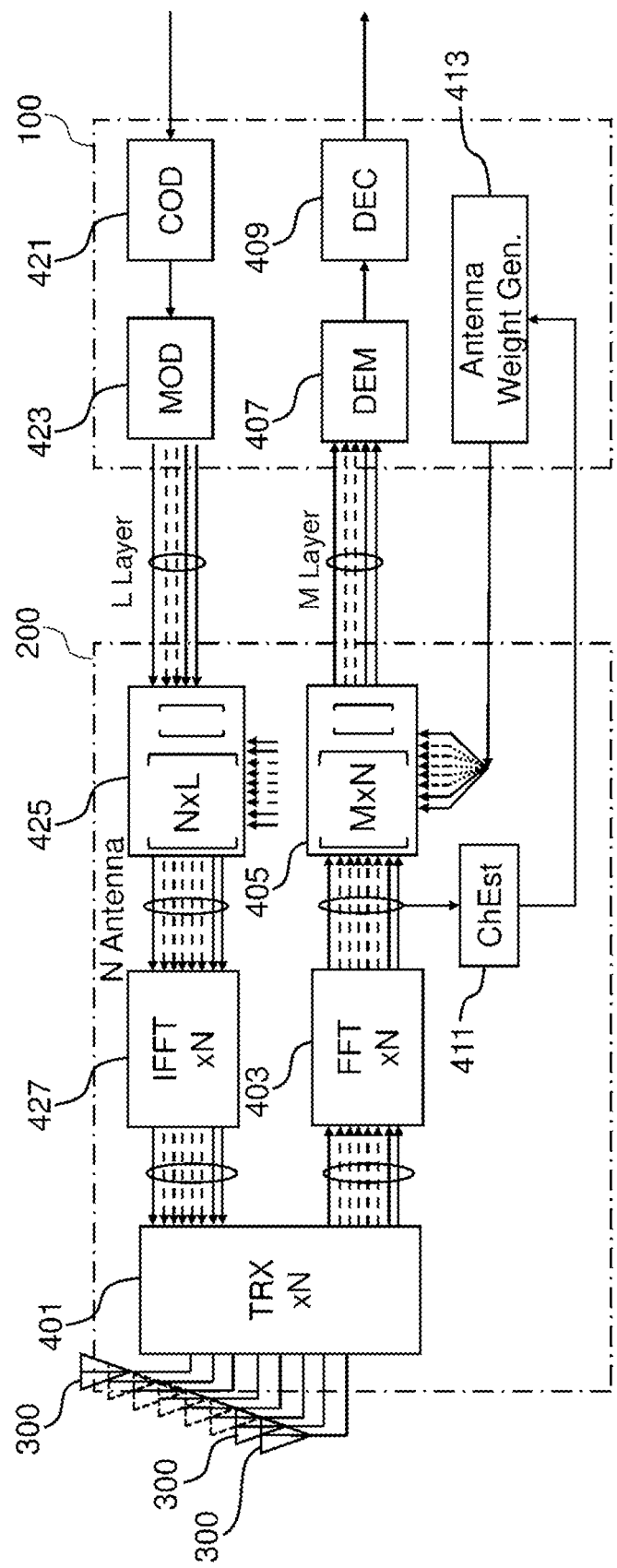
FIG. 12 is an explanatory diagram for describing a second example of channel estimation and weight information generation of the first example embodiment.

With reference to FIG. 12, a second example of channel estimation and weight information generation will be described. FIG. 12 is an explanatory diagram for describing a second example of channel estimation and weight information generation of the first example embodiment. With reference to FIG. 12, the radio apparatus 200 (channel estimation unit 411: radio communication processing unit 241) performs channel estimation, based on reference signals (N series of reference signals) of an output (N series of received signals on a frequency axis) of the FFT unit 403 to calculate channel estimates (N series of channel estimates). Then, the radio apparatus 200 (transmission processing unit 243) transmits the channel estimates to the digital apparatus 100. The digital apparatus 100 (reception processing unit 133) receives the channel estimates. Further, the digital apparatus 100 (antenna weight generating unit 413: generating unit 135) calculates receiving antenna weights (receiving antenna weight matrix having M rows and N columns), based on the channel estimates to generate weight information related to the receiving antenna weights. The subsequent processing is the same as the processing of the example of FIG. 9, and hence overlapping description thereof is herein omitted.

According to this example, what is to be transmitted from the radio apparatus 200 to the digital apparatus 100 is not reference signals themselves, but is channel estimates. For example, an amount of data of channel estimates may be compressed by averaging of channel estimates on a frequency axis or the like. Therefore, a band of an interface between the radio apparatus 200 and the digital apparatus 100 can be further small.

(2-3) Weight Information

As described above, the weight information is weight information related to the receiving antenna weights. For example, the weight information is information indicating the receiving antenna weights.

Moreover, as described above, the receiving antenna weights are weights by which the radio apparatus 200 multiplies signals received via the plurality of antennas 300. For example, the receiving antenna weights are weights by which the radio apparatus 200 multiplies signals from the terminal apparatus 40, the signals being received via the plurality of antennas.

For example, as described above, the receiving antenna weights are a receiving antenna weight matrix having M rows and N columns (a vector if M is 1). In this case, the weight information is information indicating the receiving antenna weight matrix having M rows and N columns.

As a first example, the weight information includes information indicating respective weights included in the receiving antenna weights. Specifically, for example, the receiving antenna weights are a receiving antenna weight matrix having M rows and N columns, and the weight information includes information indicating respective elements (weights) included in the receiving antenna weight matrix. Specifically, the weight information includes information indicating respective M×N elements. For example, this configuration enables more flexible setting of receiving antenna weights.

As a second example, the receiving antenna weights may be one receiving antenna weight set included in a plurality of predetermined receiving antenna weight sets, and the weight information may be an index indicating the one receiving antenna weight set. Specifically, for example, a plurality of receiving antenna weight sets and an index indicating each of the plurality of receiving antenna weight sets may be defined as a codebook in advance, and the weight information may be an index indicating one receiving antenna weight set in the codebook. This configuration further reduces an amount of information of weight information, for example.

(2-4) Information Related to Use of Receiving Antenna Weights

For example, the digital apparatus 100 (transmission processing unit 137) transmits, to the radio apparatus 200, the weight information and information related to use of the receiving antenna weights (hereinafter referred to as "use information"). This configuration enables the radio apparatus 200 to actually perform multiplication of the receiving antenna weights, for example.

Frequency Information

For example, the use information includes frequency information related to frequencies for which the receiving antenna weights are used. For example, the frequencies for which the receiving antenna weights are used are frequencies allocated to the terminal apparatus 40. Specifically, the frequency information is information related to frequencies allocated to the terminal apparatus 40.

For example, the frequency information indicates a frequency block for which the receiving antenna weights are used, out of a plurality of frequency blocks. In other words, the frequency information indicates a frequency block in which signals to be multiplied by the plurality of antenna weights are transmitted. The frequency information may indicate one frequency block, or may indicate a plurality of frequency blocks. For example, the frequency block is a resource block (or a resource block group).

Further, or alternatively, the frequency information may indicate a frequency resolution of the receiving antenna weights. In other words, the frequency information may indicate a width (unit width) of the frequencies for which the receiving antenna weights are used.

Such frequency information as described above allows the radio apparatus 200 to be notified of which signals the radio apparatus 200 needs to multiply by the receiving antenna weights, and frequencies in which the signals are transmitted, for example.

Time Information

For example, the use information includes time information related to time when the receiving antenna weights are used. For example, the time when the receiving antenna weights are used is time allocated to the terminal apparatus 40. Specifically, the time information is information related to time allocated to the terminal apparatus 40.

For example, the time information indicates a period in which the receiving antenna weights are used. In other words, the time information indicates a period in which signals to be multiplied by the plurality of antenna weights are transmitted. The period may be a subframe, or may be a slot. However, the period is not limited to these examples.

Such time information as described above allows the radio apparatus 200 to be notified of which signals the radio apparatus 200 needs to multiply by the receiving antenna weights, and time when the signals are transmitted, for example.

The frequency information and the time information may be radio resource information (which may also be referred to as resource allocation information or scheduling information) related to radio resources in which the receiving antenna weights are used.

As described above, the radio apparatus 200 transmits the channel related information to the digital apparatus 100. The digital apparatus 100 generates the weight information related to the receiving antenna weights, based on the channel related information, and transmits the weight information to the radio apparatus 200. Then, the radio apparatus 200 multiplies the signals received via the plurality of antennas 300 by the receiving antenna weights. In this manner, generation of the weight information (calculation of the receiving antenna weights) is performed by the digital apparatus 100, not by the radio apparatus 200. Therefore, a circuit scale of the radio apparatus 200 can be small.

(3) Flow of Processing

Radio Communication Processing

Figure 13:
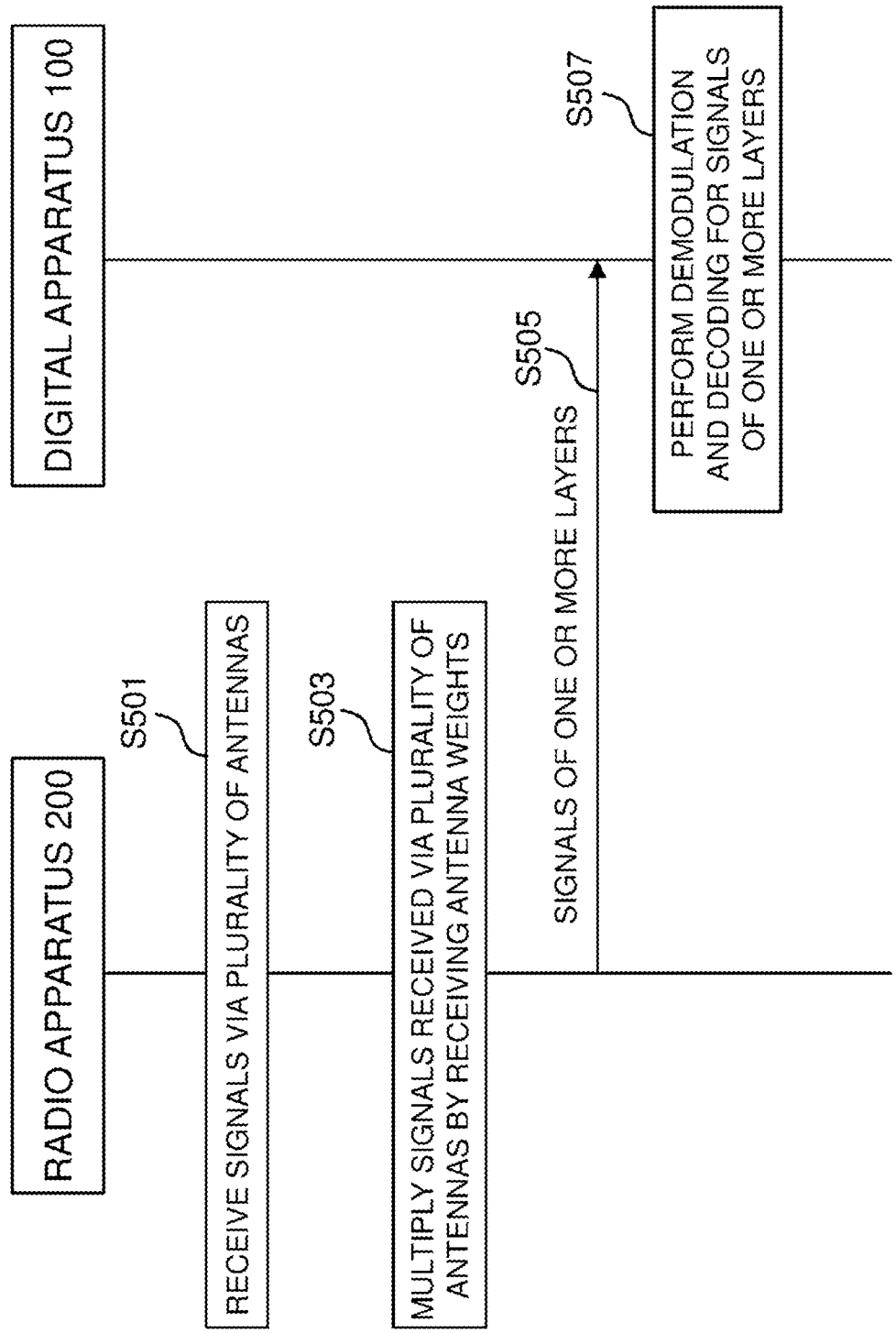
FIG. 13 is a sequence diagram for describing an example of a schematic flow of radio communication processing of the first example embodiment.

With reference to FIG. 13, an example of radio communication processing according to the first example embodiment will be described. FIG. 13 is a sequence diagram for describing an example of a schematic flow of radio communication processing according to the first example embodiment.

The radio apparatus 200 receives signals via the plurality of antennas 300 (S501).

The radio apparatus 200 multiplies the signals received via the plurality of antennas 300 by receiving antenna weights (S503). In this manner, for example, signals of one or more layers are generated.

The radio apparatus 200 transmits the signals of one or more layers to the digital apparatus 100 (S505).

The digital apparatus 100 performs demodulation and decoding for the signals of one or more layers (S507).

Figure 14:
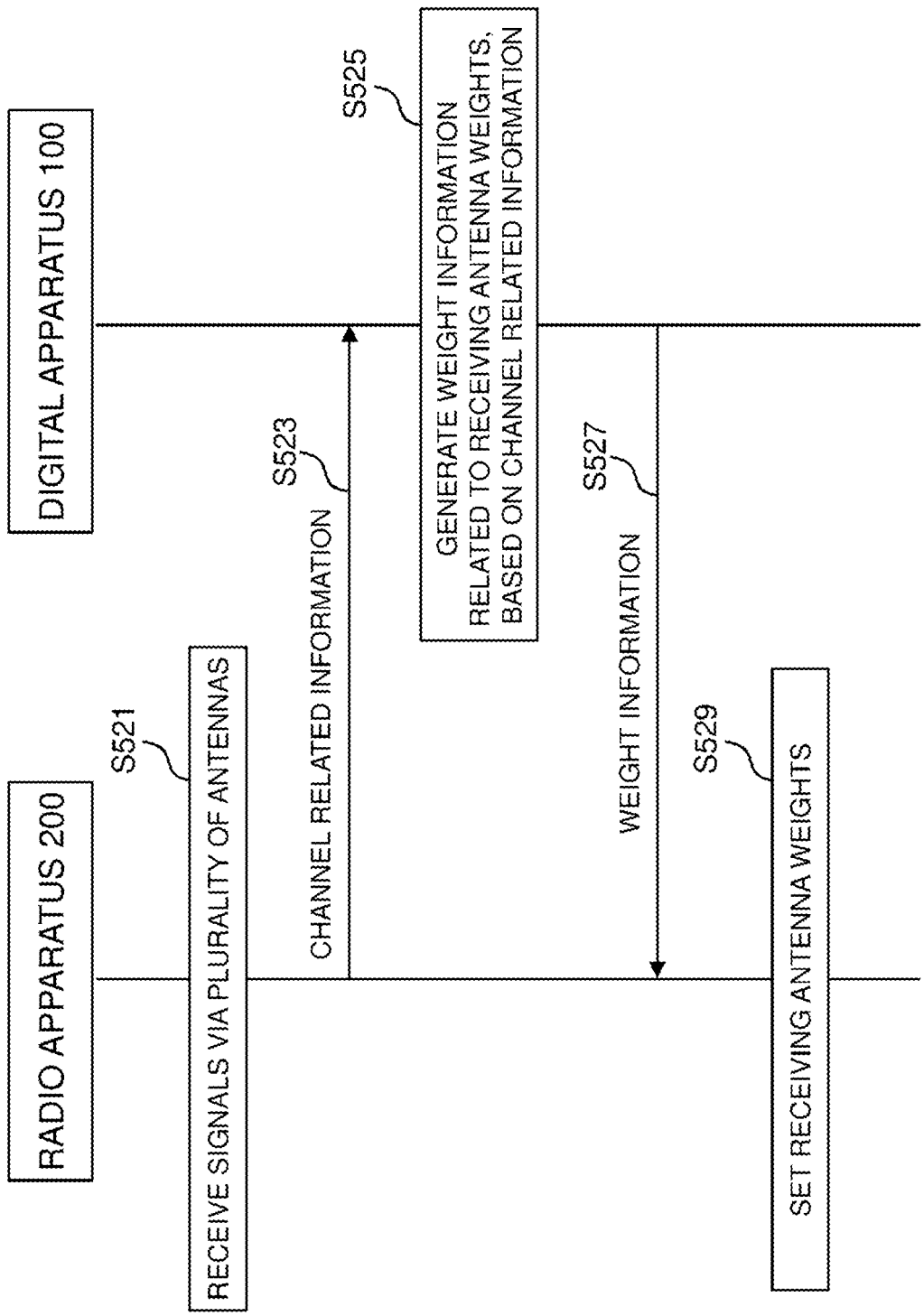
FIG. 14 is a sequence diagram for describing an example of a schematic flow of processing of transmission and/or reception of channel related information and weight information according to the first example embodiment.

Transmission and/or Reception of Channel Related Information and Weight Information With reference to FIG. 14, an example of processing of transmission and/or reception of channel related information and weight information according to the first example embodiment will be described. FIG. 14 is a sequence diagram for describing an example of a schematic flow of processing of transmission and/or reception of channel related information and weight information according to the first example embodiment.

The radio apparatus 200 receives signals via the plurality of antennas 300 (S521).

The radio apparatus 200 transmits channel related information related to a channel of the signals received via the plurality of antennas 300 to the digital apparatus 100, and the digital apparatus 100 receives the channel related information (S523).

The digital apparatus 100 generates weight information related to receiving antenna weights, based on the channel related information (S525).

The digital apparatus 100 transmits the weight information to the radio apparatus 200, and the radio apparatus 200 receives the weight information (S527).

The radio apparatus 200 sets the receiving antenna weights as weights to be used to multiply signals received via the plurality of antennas 300 (S529).

<3.5. Example Alteration>

As described above, in the first example embodiment, the digital apparatus 100 (transmission processing unit 137) transmits, to the radio apparatus 200, weight information related to receiving antenna weights by which the radio apparatus 200 multiplies signals received via the plurality of antennas 300. The radio apparatus 200 (reception processing unit 245) receives the weight information from the digital apparatus 100.

First Example

In an example alteration of the first example embodiment, for example, the digital apparatus 100 (transmission processing unit 137) may also transmit, to the radio apparatus 200, other weight information related to transmitting antenna weights which the radio apparatus 200 uses for generation of signals to be transmitted via the plurality of antennas 300. Then, the radio apparatus 200 (reception processing unit 245) may receive such other weight information from the digital apparatus 100. For example, the digital apparatus 100 (generating unit 135) may generate such other weight information, based on the channel related information.

The transmitting antenna weights may be a transmitting antenna weight matrix having N rows and L columns (a vector if L is 1).

Such other weight information related to the transmitting antenna weights may be information in a format the same as a format of the weight information related to the receiving antenna weights.

The radio apparatus 200 (radio communication processing unit 241) may set the transmitting antenna weights, based on such other weight information. Then, the radio apparatus 200 (radio communication processing unit 241) may multiply signals of one or more layers (e.g., signals of L layers) by the transmitting antenna weights, to thereby generate signals to be transmitted via the plurality of antennas 300.

Second Example

Alternatively, the receiving antenna weights may be antenna weights which the radio apparatus 200 also uses for generation of signals to be transmitted via the plurality of antennas. Specifically, the receiving antenna weights and the transmitting antenna weights may be the same. For example, when the number L of transmission layers and the number M of reception layers are the same, the receiving antenna weights and the transmitting antenna weights may be the same, as described above.

Regardless of the first example or the second example, in a first example alteration in particular, the base station 10 (digital apparatus 100 and radio apparatus 200) may perform communication in TDD.

The first example embodiment has been described above. According to the first example embodiment, both a circuit scale of the radio apparatus 200 and a band of an interface between the radio apparatus 200 and the digital apparatus 100 can be small.

4. Second Example Embodiment

Figure 15:
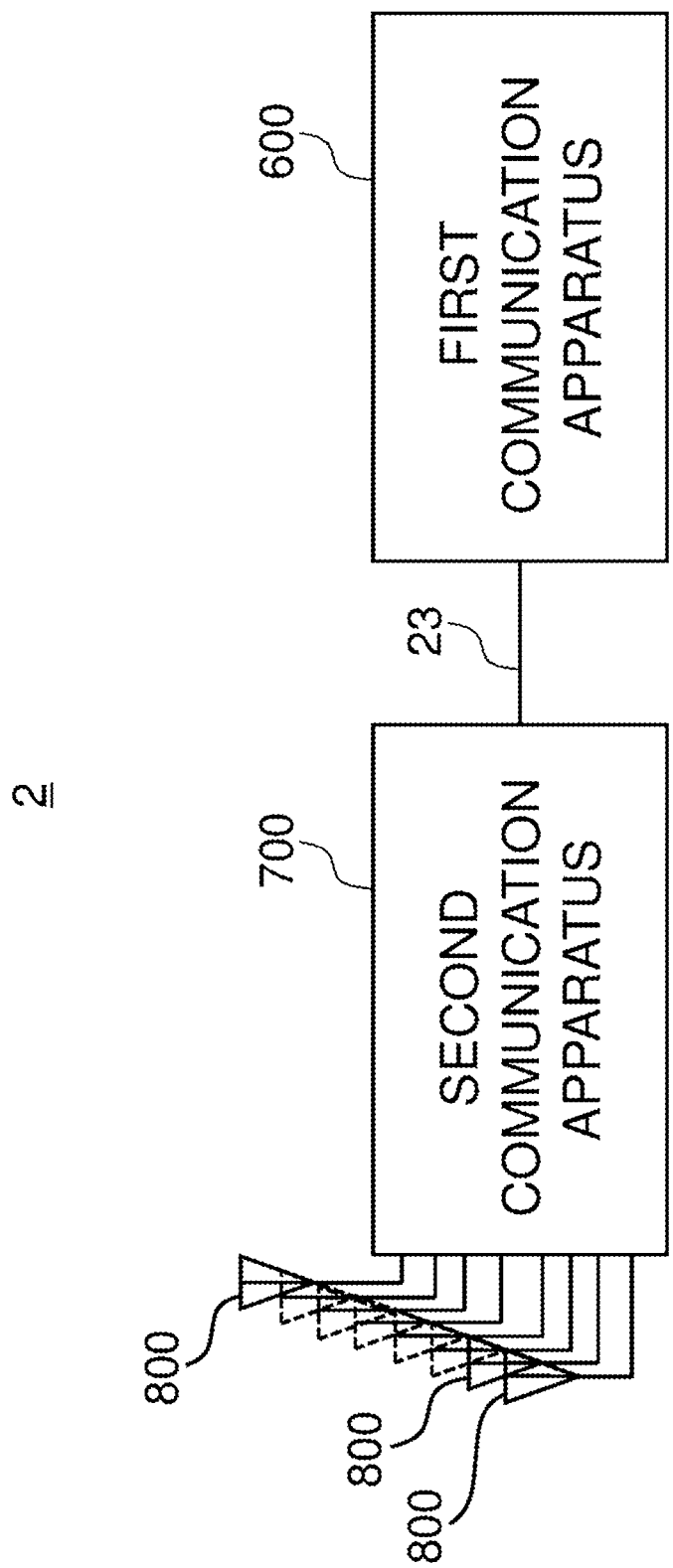
FIG. 15 is an explanatory diagram illustrating an example of a schematic configuration of a system according to a second example embodiment.
Figure 16:
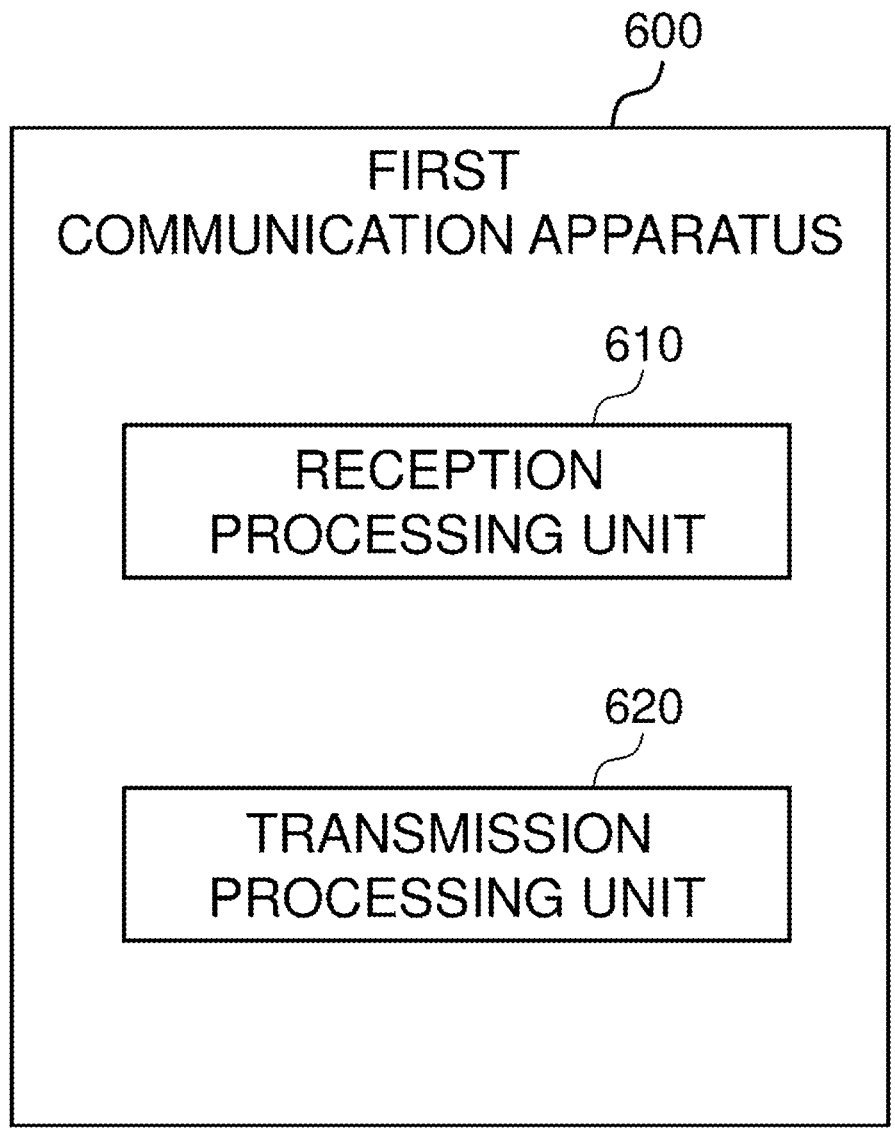
FIG. 16 is a block diagram illustrating an example of a schematic configuration of a first communication apparatus according to the second example embodiment.
Figure 17:
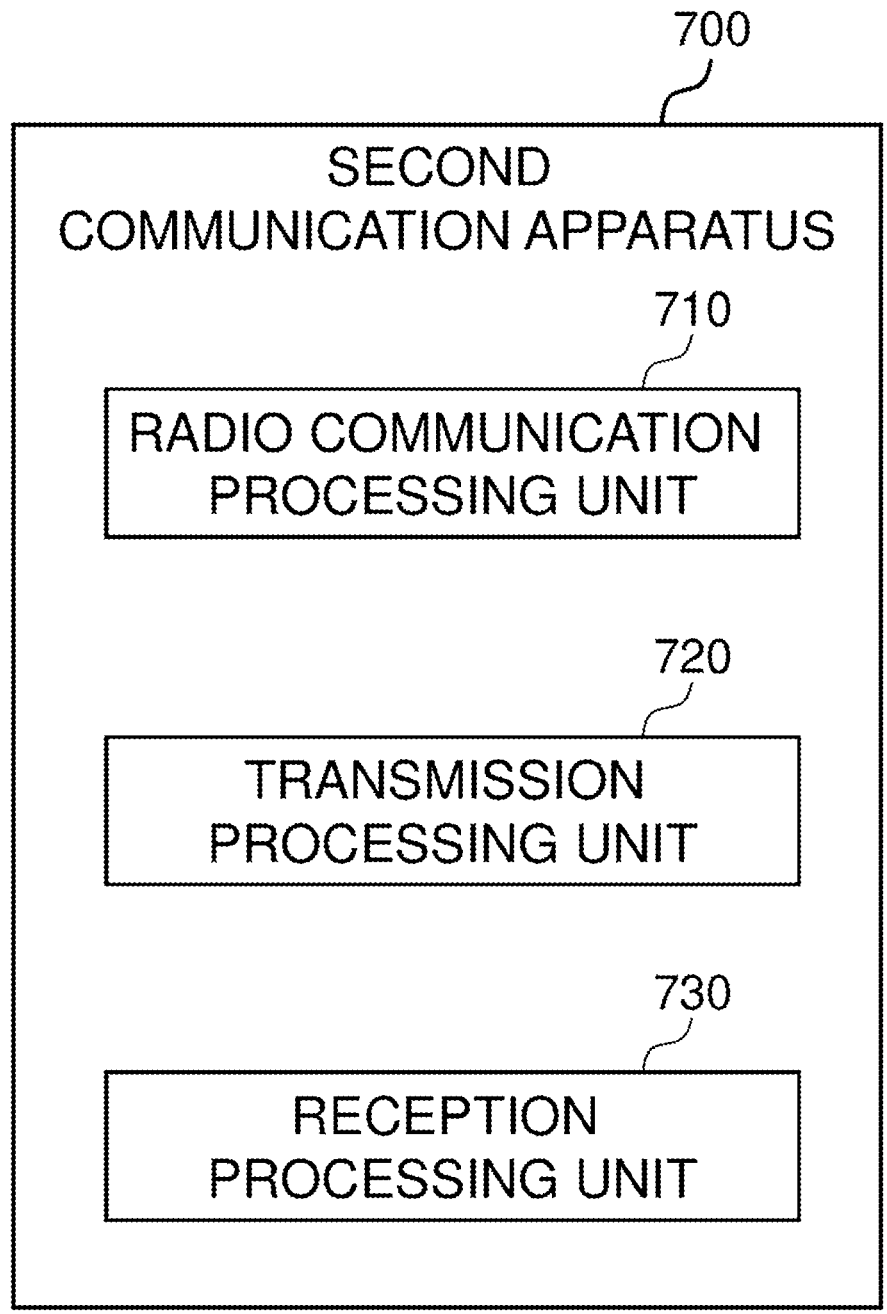
FIG. 17 is a block diagram illustrating an example of a schematic configuration of a second communication apparatus according to the second example embodiment.

Next, with reference to FIG. 15 to FIG. 17, a second example embodiment of the present invention will be described. The above-described first example embodiment is a concrete example embodiment, whereas the second example embodiment is a more generalized example embodiment.

<4.1. Configuration of System>

First, with reference to FIG. 15, an example of a configuration of a system 2 according to the second example embodiment will be described. FIG. 15 is an explanatory diagram illustrating an example of a schematic configuration of the system 2 according to the second example embodiment. With reference to FIG. 15, the system 2 includes a first communication apparatus 600, a second communication apparatus 700, and a plurality of antennas 800.

For example, the system 2 is a base station. For example, description concerning the base station is the same as the description concerning the base station 10 of the first example embodiment. Hence, overlapping description thereof is herein omitted.

First Communication Apparatus 600 and Second Communication Apparatus 700

For example, each of the first communication apparatus 600 and the second communication apparatus 700 is one of a plurality of apparatuses constituting a base station. The system 2 (base station) may further include another apparatus (not illustrated) other than the first communication apparatus 600 and the second communication apparatus 700 (and the plurality of antennas 800).

The second communication apparatus 700 is an apparatus physically separated from the first communication apparatus 600. For example, the second communication apparatus 700 is connected to the plurality of antennas 800. The first communication apparatus 600 is connected to the second communication apparatus 700. For example, the first communication apparatus 600 and the second communication apparatus 700 are connected to each other with a communication line 23. The first communication apparatus 600 receives information from the second communication apparatus 700 via the communication line 23, and transmits information to the second communication apparatus 700 via the communication line 23. For example, the communication line 23 is an optical fiber line (optical fiber cable). Further, for example, the first communication apparatus 600 is located indoors, and the second communication apparatus 700 is located outdoors.

When the base station (system 2) includes the first unit and the second unit (refer to the first example embodiment), the first communication apparatus 600 may be the first unit (e.g., a digital unit (DU) or a BBU), and the second communication apparatus 700 may be the second unit (e.g., a remote/radio unit (RU), an RRH, or an RRU). Alternatively, the first communication apparatus 600 and the second communication apparatus 700 may be apparatuses included in the second unit (e.g., a distributed unit (DU)).

Plurality of Antennas 800

For example, each of the plurality of antennas 800 is an antenna element included in a multi-element antenna. For example, the multi-element antenna is an antenna for massive MIMO.

The configuration of the system 2 has been described above. As an example, the first communication apparatus 600 may be the digital apparatus 100 of the first example embodiment. The second communication apparatus 700 may be the radio apparatus 200 of the first example embodiment. The plurality of antennas 800 may be the plurality of antennas 300 of the first example embodiment. Of course, the second example embodiment is not limited to this example. As an example, the first communication apparatus 600 may be an apparatus (a component or a module) included in the digital apparatus 100 of the first example embodiment, and the second communication apparatus 700 may be an apparatus (a component or a module) included in the radio apparatus 200 of the first example embodiment. As another example, the first communication apparatus 600 may be a third apparatus that is different from a digital apparatus, while the second communication apparatus 700 is a radio apparatus.

<4.2. Configuration of First Communication Apparatus>

Next, with reference to FIG. 16, an example of a configuration of the first communication apparatus 600 according to the second example embodiment will be described. FIG. 16 is a block diagram illustrating an example of a schematic configuration of the first communication apparatus 600 according to the second example embodiment. With reference to FIG. 16, the first communication apparatus 600 includes a reception processing unit 610 and a transmission processing unit 620.

Concrete operations of the reception processing unit 610 and the transmission processing unit 620 will be described later.

The reception processing unit 610 and the transmission processing unit 620 may be implemented with one or more processors (such as a BB processor and/or another type of processor) and a memory.

The first communication apparatus 600 may include a memory that stores a program (instructions), and one or more processors that can execute the program (instructions). The one or more processors may execute the program to perform operations of the reception processing unit 610 and the transmission processing unit 620. The program may be a program for causing the processor(s) to execute operations of the reception processing unit 610 and the transmission processing unit 620.

Note that, of course, the first communication apparatus 600 may further include a constituent element other than the reception processing unit 610 and the transmission processing unit 620. For example, the first communication apparatus 600 may further include a constituent element (e.g., the interface 110, the storage unit 120, the radio communication processing unit 131, and/or the generating unit 135) included in the digital apparatus 100 of the first example embodiment.

<4.3. Configuration of Second Communication Apparatus>

Next, with reference to FIG. 17, an example of a configuration of the second communication apparatus 700 according to the second example embodiment will be described. FIG. 17 is a block diagram illustrating an example of a schematic configuration of the second communication apparatus 700 according to the second example embodiment. With reference to FIG. 17, the second communication apparatus 700 includes a radio communication processing unit 710, a transmission processing unit 720, and a reception processing unit 730.

Concrete operations of the radio communication processing unit 710, the transmission processing unit 720, and the reception processing unit 730 will be described later.

The radio communication processing unit 710, the transmission processing unit 720, and the reception processing unit 730 may be implemented with one or more processors (such as a BB processor and/or another type of processor) and a memory.

The second communication apparatus 700 may include a memory that stores a program (instructions), and one or more processors that can execute the program (instructions). The one or more processors may execute the program to perform operations of the radio communication processing unit 710, the transmission processing unit 720, and the reception processing unit 730. The program may be a program for causing the processor(s) to execute operations of the radio communication processing unit 710, the transmission processing unit 720, and the reception processing unit 730.

Note that, of course, the second communication apparatus 700 may further include a constituent element other than the radio communication processing unit 710, the transmission processing unit 720, and the reception processing unit 730. For example, the second communication apparatus 700 may further include a constituent element (e.g., the first interface 210, the second interface 220, and/or the storage unit 230) included in the radio apparatus 200 of the first example embodiment.

<4.4. Technical Features>

Next, technical features of the second example embodiment will be described.

(1) Radio Communication Processing

The second communication apparatus 700 (radio communication processing unit 710) receives signals via the plurality of antennas 800. Further, in the second example embodiment in particular, the second communication apparatus 700 (radio communication processing unit 710) multiplies the signals received via the plurality of antennas 800 by receiving antenna weights.

For example, description concerning such radio communication processing (reception processing) is similar to the description of the radio communication processing (reception processing) of the first example embodiment. Further, description concerning transmission processing may also be similar to the description of the transmission processing of the first example embodiment. In this case, the second communication apparatus 700 (radio communication processing unit 710) may operate similarly to the radio apparatus 200 (radio communication processing unit 241) of the first example embodiment. The first communication apparatus 600 may operate similarly to the digital apparatus 100 (radio communication processing unit 131) of the first example embodiment. Hence, overlapping description thereof is herein omitted.

Note that, of course, the second example embodiment is not limited to the example described above. As an example, another apparatus (digital apparatus) that is not the first communication apparatus 600 may perform radio communication processing.

(2) Receiving Antenna Weights

In the second example embodiment in particular, the second communication apparatus 700 (transmission processing unit 720) transmits, to the first communication apparatus 600, channel related information related to a channel of signals received via the plurality of antennas 800. The first communication apparatus 600 (reception processing unit 610) receives the channel related information from the second communication apparatus 700.

Based on the channel related information, weight information related to receiving antenna weights is generated.

Further, the first communication apparatus 600 (transmission processing unit 620) transmits the weight information to the second communication apparatus 700. The second communication apparatus 700 (reception processing unit 730) receives the weight information from the first communication apparatus 600.

After that, the second communication apparatus 700 (radio communication processing unit 710) multiplies the signals received via the plurality of antennas 800 by the receiving antenna weights.

For example, description concerning such receiving antenna weights is similar to the description concerning the receiving antenna weights of the first example embodiment. In this case, the second communication apparatus 700 (radio communication processing unit 710, transmission processing unit 720, and reception processing unit 730) may operate similarly to the radio apparatus 200 (radio communication processing unit 241, transmission processing unit 243, reception processing unit 245) of the first example embodiment. The first communication apparatus 600 (reception processing unit 610 and transmission processing unit 620) may operate similarly to the digital apparatus 100 (reception processing unit 133 and transmission processing unit 137) of the first example embodiment. Hence, overlapping description thereof is herein omitted.

Note that, of course, the second example embodiment is not limited to the example described above. As an example, another apparatus that is not the first communication apparatus 600 may generate the weight information, based on the channel related information.

(3) Flow of Processing

As an example, processing of the second example embodiment is the same as the processing of the first example embodiment. Hence, overlapping description thereof is herein omitted. Note that, of course, the second example embodiment is not limited to this example.

The second example embodiment has been described above. According to the second example embodiment, both a circuit scale of the second communication apparatus 700 and a band of an interface between the second communication apparatus 700 and another communication apparatus (e.g., the first communication apparatus 600) can be small. Note that the first example alteration of the first example embodiment may also be applied to the second example embodiment.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not be necessarily performed in the order described in the corresponding sequence diagram in time series. For example, the steps in the processing may be performed in an order different from the order described in the sequence diagram or in parallel. In addition, some of the steps in the processing may be deleted, or more steps may be added to the processing.

Methods including operations or processing of a communication apparatus (digital apparatus, radio apparatus, first communication apparatus, or second communication apparatus) described in the Specification may be provided, and programs for causing a processor to execute the operations or processing may be provided. Moreover, non-transitory computer-readable recording media (non-transitory computer readable medium) in which the programs are recorded thereon may be provided. It is apparent that such methods, programs, and non-transitory computer readable recording media are also included in the present invention.

The whole or part of the example embodiments disclosed above can be described as, but not limited to, the following supplementary notes.

(Supplementary Note 1)

A first communication apparatus comprising:

a reception processing unit configured to receive, from a second communication apparatus which receives signals via a plurality of antennas, channel related information related to a channel of signals received via the plurality of antennas; and a transmission processing unit configured to transmit, to the second communication apparatus, weight information related to receiving antenna weights by which the second communication apparatus multiplies signals received via the plurality of antennas, the weight information being generated based on the channel related information.

(Supplementary Note 2)

The first communication apparatus according to Supplementary Note 1, wherein the weight information is information indicating the receiving antenna weights.

(Supplementary Note 3)

The first communication apparatus according to Supplementary Note 2, wherein the weight information includes information indicating respective weights included in the receiving antenna weights.

(Supplementary Note 4)

The first communication apparatus according to Supplementary Note 2, wherein the receiving antenna weights are one receiving antenna weight set included in a plurality of predetermined receiving antenna weight sets, and the weight information is an index indicating the one receiving antenna weight set.

(Supplementary Note 5)

The first communication apparatus according to any one of Supplementary Notes 1 to 4, wherein the transmission processing unit is configured to transmit, to the second communication apparatus, the weight information and information related to use of the receiving antenna weights.

(Supplementary Note 6)

The first communication apparatus according to Supplementary Note 5, wherein the information related to use of the receiving antenna weights includes frequency information related to frequencies for which the receiving antenna weights are used.

(Supplementary Note 7)

The first communication apparatus according to Supplementary Note 6, wherein the frequency information indicates a frequency block for which the receiving antenna weights are used, out of a plurality of frequency blocks.

(Supplementary Note 8)

The first communication apparatus according to Supplementary Note 6 or 7, wherein the frequency information indicates a frequency resolution of the receiving antenna weights.

(Supplementary Note 9)

The first communication apparatus according to any one of Supplementary Notes 6 to 8, wherein the channel is a channel between a terminal apparatus and the plurality of antennas, the receiving antenna weights are weights by which the second communication apparatus multiplies signals from the terminal apparatus, the signals being received via the plurality of antennas, and the frequency information is information related to frequencies allocated to the terminal apparatus.

(Supplementary Note 10)

The first communication apparatus according to Supplementary Note 5, wherein the information related to use of the receiving antenna weights includes time information related to time when the receiving antenna weights are used.

(Supplementary Note 11)

The first communication apparatus according to Supplementary Note 10, wherein the channel is a channel between a terminal apparatus and the plurality of antennas, the receiving antenna weights are weights by which the second communication apparatus multiplies signals from the terminal apparatus, the signals being received via the plurality of antennas, and the time information is information related to time allocated to the terminal apparatus.

(Supplementary Note 12)

The first communication apparatus according to any one of Supplementary Notes 1 to 11, wherein the channel related information is reference signals received via the plurality of antennas.

(Supplementary Note 13)

The first communication apparatus according to any one of Supplementary Notes 1 to 12, wherein the channel related information is channel estimates which the second communication apparatus calculates by channel estimation based on reference signals received via the plurality of antennas.

(Supplementary Note 14)

The first communication apparatus according to Supplementary Note 12 or 13, wherein the reference signals are reference signals transmitted during a specific period in a time frame.

(Supplementary Note 15)

The first communication apparatus according to Supplementary Note 14, wherein the time frame is a radio frame, and the specific period is a specific symbol.

(Supplementary Note 16)

The first communication apparatus according to any one of Supplementary Notes 12 to 15, wherein the reference signals are sounding reference signals (SRS) or demodulation reference signals (DMRS).

(Supplementary Note 17)

The first communication apparatus according to any one of Supplementary Notes 1 to 16, further comprising a generating unit configured to generate the weight information based on the channel related information.

(Supplementary Note 18)

The first communication apparatus according to any one of Supplementary Notes 1 to 17, further comprising a radio communication processing unit configured to perform demodulation and decoding for signals of one or more layers generated by the second communication apparatus multiplying signals received via the plurality of antennas by the receiving antenna weights.

(Supplementary Note 19)

The first communication apparatus according to any one of Supplementary Notes 1 to 18, wherein the transmission processing unit is configured to transmit, to the second communication apparatus, other weight information related to transmitting antenna weights which the second communication apparatus uses for generation of signals to be transmitted via the plurality of antennas, the other weight information being generated based on the channel related information.

(Supplementary Note 20)

The first communication apparatus according to any one of Supplementary Notes 1 to 18, wherein the receiving antenna weights are antenna weights which the second communication apparatus also uses for generation of signals to be transmitted via the plurality of antennas.

(Supplementary Note 21)

The first communication apparatus according to Supplementary Note 19 or 20, wherein the second communication apparatus is an apparatus which performs communication in time division duplex (TDD).

(Supplementary Note 22)

The first communication apparatus according to any one of Supplementary Notes 1 to 21, wherein the signals are uplink signals.

(Supplementary Note 23)

The first communication apparatus according to any one of Supplementary Notes 1 to 22, wherein each of the first communication apparatus and the second communication apparatus is one of a plurality of apparatuses constituting a base station.

(Supplementary Note 24)

The first communication apparatus according to any one of Supplementary Notes 1 to 23, wherein the channel is a channel between a terminal apparatus and the plurality of antennas, and the receiving antenna weights are weights by which the second communication apparatus multiplies signals from the terminal apparatus, the signals being received via the plurality of antennas.

(Supplementary Note 25)

The first communication apparatus according to any one of Supplementary Notes 1 to 24, wherein each of the plurality of antennas is an antenna element included in a multi-element antenna.

(Supplementary Note 26)

The first communication apparatus according to Supplementary Note 25, wherein the multi-element antenna is an antenna for massive multiple-input and multiple-output (MIMO).

(Supplementary Note 27)

The first communication apparatus according to any one of Supplementary Notes 1 to 26, wherein the transmission processing unit is configured to receive the channel related information from the second communication apparatus via a communication line, and the reception processing unit is configured to transmit the weight information to the second communication apparatus via the communication line.

(Supplementary Note 28)

The first communication apparatus according to Supplementary Note 27, wherein the communication line is an optical fiber line.

(Supplementary Note 29)

The first communication apparatus according to any one of Supplementary Notes 1 to 28, wherein the second communication apparatus is an apparatus physically separated from the first communication apparatus.

(Supplementary Note 30)

The first communication apparatus according to any one of Supplementary Notes 1 to 29, wherein the second communication apparatus is an apparatus connected to the plurality of antennas, and the first communication apparatus is an apparatus connected to the second communication apparatus.

(Supplementary Note 31)

The first communication apparatus according to any one of Supplementary Notes 1 to 30, wherein the first communication apparatus is an apparatus located indoors, and the second communication apparatus is an apparatus located outdoors.

(Supplementary Note 32)

A second communication apparatus comprising:

a radio communication processing unit configured to receive signals via a plurality of antennas;

a transmission processing unit configured to transmit, to a first communication apparatus, channel related information related to a channel of signals received via the plurality of antennas; and reception processing unit configured to receive, from the first communication apparatus, weight information related to reception antenna weights, the weight information being generated based on the channel related information, wherein the radio communication processing unit is configured to multiply signals received via the plurality of antennas by the receiving antenna weights.

(Supplementary Note 33)

A method comprising:

receiving, from a communication apparatus which receives signals via a plurality of antennas, channel related information related to a channel of signals received via the plurality of antennas; and transmitting, to the communication apparatus, weight information related to receiving antenna weights by which the communication apparatus multiplies signals received via the plurality of antennas, the weight information being generated based on the channel related information.

(Supplementary Note 34)

A method comprising:

receiving signals via a plurality of antennas;

transmitting, to a communication apparatus, channel related information related to a channel of signals received via the plurality of antennas;

receiving, from the communication apparatus, weight information related to reception antenna weights, the weight information being generated based on the channel related information; and multiplying signals received via the plurality of antennas by the receiving antenna weights.

(Supplementary Note 35)

A program that causes a processor to execute:

receiving, from a communication apparatus which receives signals via a plurality of antennas, channel related information related to a channel of signals received via the plurality of antennas; and transmitting, to the communication apparatus, weight information related to receiving antenna weights by which the communication apparatus multiplies signals received via the plurality of antennas, the weight information being generated based on the channel related information.

(Supplementary Note 36)

A program that causes a processor to execute:

receiving signals via a plurality of antennas;

transmitting, to a communication apparatus, channel related information related to a channel of signals received via the plurality of antennas;

receiving, from the communication apparatus, weight information related to reception antenna weights, the weight information being generated based on the channel related information; and multiplying signals received via the plurality of antennas by the receiving antenna weights.

(Supplementary Note 37)

A non-transitory computer readable recording medium having recorded thereon a program that causes a processor to execute:

receiving, from a communication apparatus which receives signals via a plurality of antennas, channel related information related to a channel of signals received via the plurality of antennas; and transmitting, to the communication apparatus, weight information related to receiving antenna weights by which the communication apparatus multiplies signals received via the plurality of antennas, the weight information being generated based on the channel related information.

(Supplementary Note 38)

A non-transitory computer readable recording medium having recorded thereon a program that causes a processor to execute:

receiving signals via a plurality of antennas;

transmitting, to a communication apparatus, channel related information related to a channel of signals received via the plurality of antennas;

receiving, from the communication apparatus, weight information related to reception antenna weights, the weight information being generated based on the channel related information; and multiplying signals received via the plurality of antennas by the receiving antenna weights.

(Supplementary Note 39)

A system comprising:

a first communication apparatus; and a second communication apparatus, wherein the second communication apparatus is configured to:

receive signals via a plurality of antennas; and transmit, to the first communication apparatus, channel related information related to a channel of signals received via the plurality of antennas, wherein the first communication apparatus is configured to:

receive the channel related information from the second communication apparatus; and transmit, to the second communication apparatus, weight information related to receiving antenna weights, the weight information being generated based on the channel related information, and wherein the second communication apparatus is configured to:

receive the weight information from the first communication apparatus; and multiply signals received via the plurality of antennas by the receiving antenna weights.

(Supplementary Note 40)

A method comprising:

in a second communication apparatus, receiving signals via a plurality of antennas; and transmitting, to a first communication apparatus, channel related information related to a channel of signals received via the plurality of antennas, in the first communication apparatus, receiving the channel related information from the second communication apparatus; and transmitting, to the second communication apparatus, weight information related to receiving antenna weights, the weight information being generated based on the channel related information, and in the second communication apparatus, receiving the weight information from the first communication apparatus; and multiplying signals received via the plurality of antennas by the receiving antenna weights.

In a mobile communication system, both a circuit scale of an apparatus that receives signals via antennas and a band of an interface between apparatuses can be small.

REFERENCE SIGNS LIST 1, 2 System
10 Base station
21, 23 Communication line
40 Terminal apparatus
100 Digital apparatus
131 Radio communication processing unit
133, 610 Reception processing unit
135 Generating unit
137, 620 Transmission processing unit
200 Radio apparatus
241, 710 Radio communication processing unit
243, 720 Transmission processing unit
245, 730 Reception processing unit
300, 800 Antenna
411 Channel estimation unit
413 Antenna weight generating unit
600 First communication apparatus
700 Second communication apparatus
1001 Time frame
1003 Specific period
1011 Reference signals

What is claimed is:

1. A method performed by a base band unit, the method comprising:

hosting a first physical layer;

receiving reference signals from a radio unit, wherein the radio unit is configured to host a second physical layer being at a lower layer of a communication protocol than the first physical layer and receive signals via a plurality of antennas;

performing channel estimation based on the reference signals; and transmitting, to the radio unit, weight information related to receiving antenna weights by which signals received via the plurality of antennas are multiplied by the radio unit, wherein each of the base band unit and the radio unit is one of a plurality of apparatuses constituting a base station, and wherein the base band unit and the radio unit are physically separated, and the base band unit and the radio unit are linked by an interface requiring a frequency band.

2. The method according to claim 1, wherein the weight information is information indicating the receiving antenna weights.

3. The method according to claim 2, wherein the weight information includes information indicating respective weights included in the receiving antenna weights.

4. The method according to claim 2, wherein
the receiving antenna weights are one receiving antenna weight set included in a plurality of predetermined receiving antenna weight sets, and
the weight information is an index indicating the one receiving antenna weight set.

5. The method according to claim 1, wherein the weight information is generated based on channel estimates calculated by the channel estimation.

6. The method according to claim 1 further comprising:
transmitting, to the radio unit, the weight information and information related to use of the receiving antenna weights.

7. The method according to claim 6, wherein the information related to use of the receiving antenna weights includes frequency information related to frequencies for which the receiving antenna weights are used.

8. The method according to claim 6, wherein the information related to use of the receiving antenna weights includes time information related to time when the receiving antenna weights are used.

9. The method according to claim 1, wherein the reference signals are reference signals transmitted during a specific period in a time frame.

10. The method according to claim 9, wherein
the time frame is a radio frame, and
the specific period is a specific symbol.

11. The method according to claim 1, wherein the reference signals are sounding reference signals (SRS) or demodulation reference signals (DMRS).

12. The method according to claim 1 further comprising:
generating the weight information based on the reference signals.

13. The method according to claim 1 further comprising:
performing demodulation and decoding for signals of one or more layers generated by the radio unit multiplying signals received via the plurality of antennas by the receiving antenna weights.

14. The method according to claim 1 further comprising:
transmitting, to the radio unit, other weight information related to transmitting antenna weights which the radio unit uses for generation of signals to be transmitted via the plurality of antennas, the other weight information being generated based on the reference signals.

15. The method according to claim 1, wherein the receiving antenna weights are antenna weights which the radio unit also uses for generation of signals to be transmitted via the plurality of antennas.

16. The method according to claim 14, wherein the radio unit is an apparatus which performs communication in time division duplex (TDD).

17. The method according to claim 1, wherein the receiving antenna weights are weights by which the radio unit multiplies signals from the terminal apparatus, the signals being received via the plurality of antennas.

18. The method according to claim 1 further comprising:
transmitting, to the radio unit, other weight information related to transmitting antenna weights, and
wherein the other weight information related to transmitting antenna weights is information in a format the same as a format of the weight information related to the receiving antenna weights.

19. A method performed by radio unit comprising:
hosting a second physical layer being at a lower layer of a communication protocol than a first physical layer;
receiving signals via a plurality of antennas;
transmitting, to a base band unit, reference signals to be used for channel estimation performed by the base band unit, wherein the base band unit is configured to host the first physical layer;
receiving, from the base band unit, weight information related to reception antenna weights, and
multiplying signals received via the plurality of antennas by the receiving antenna weights,
wherein each of the base band unit and the radio unit is one of a plurality of apparatuses constituting a base station, and
wherein the base band unit and the radio unit are physically separated, and the base band unit and the radio unit are linked by an interface requiring a frequency band.

20. A base band unit comprising:
a memory storing instructions; and
one or more processors configured to execute the instructions to:
host a first physical layer;
receive reference signals from a radio unit, wherein the radio unit is configured to host a second physical layer being at a lower layer of a communication protocol than the first physical layer and receive signals via a plurality of antennas;
perform channel estimation based on the reference signals; and
transmit, to the radio unit, weight information related to receiving antenna weights by which signals received via the plurality of antennas are multiplied by the radio unit,
wherein each of the base band unit and the radio unit is one of a plurality of apparatuses constituting a base station, and
wherein the base band unit and the radio unit are physically separated, and the base band unit and the radio unit are linked by an interface requiring a frequency band.

* * * * *